US008782760B2

(12) United States Patent
Kamakura

(10) Patent No.: US 8,782,760 B2
(45) Date of Patent: Jul. 15, 2014

(54) AUTHENTICATION SYSTEM, AUTHENTICATION SERVER, AND SUB-AUTHENTICATION SERVER

(75) Inventor: Ken Kamakura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 32 days.

(21) Appl. No.: 13/091,508

(22) Filed: Apr. 21, 2011

(65) Prior Publication Data
US 2011/0202985 A1 Aug. 18, 2011

Related U.S. Application Data

(63) Continuation of application No. PCT/JP2008/069259, filed on Oct. 23, 2008.

(51) Int. Cl.
G06F 21/00 (2013.01)
(52) U.S. Cl.
USPC .............. 726/7; 713/156; 705/78; 709/221; 709/225; 709/227; 380/277; 726/3; 726/18
(58) Field of Classification Search
CPC ................................ G06F 21/31; H04L 63/08
USPC ............................................................ 726/7
See application file for complete search history.

(56) References Cited

U.S. PATENT DOCUMENTS

| 5,671,354 | A | * | 9/1997 | Ito et al. ........................ 726/3 |
| 5,841,970 | A | * | 11/1998 | Tabuki ............................ 726/2 |
| 6,085,239 | A | * | 7/2000 | Kubo et al. ................... 709/223 |
| 6,615,258 | B1 | * | 9/2003 | Barry et al. ................... 709/223 |
| 6,658,473 | B1 | * | 12/2003 | Block et al. .................. 709/226 |
| 6,853,988 | B1 | * | 2/2005 | Dickinson et al. ............. 705/75 |
| 6,977,906 | B2 | * | 12/2005 | Owens et al. ................ 370/252 |
| 6,978,381 | B1 | * | 12/2005 | Te et al. ......................... 726/18 |
| 7,036,142 | B1 | * | 4/2006 | Zhang et al. .................. 726/12 |
| 7,249,177 | B1 | * | 7/2007 | Miller ........................... 709/225 |

(Continued)

FOREIGN PATENT DOCUMENTS

JP 7-84959 3/1995
JP 2001-256191 9/2001

(Continued)

OTHER PUBLICATIONS http://www.cse.psu.edu/~mcdaniel/cse543-f11/papers/kerberos.pdf|Kerberos: An Authentication Service for Computer Networks|Neuman et al.| Sep. 1994|pp. 33-38.*

(Continued)

Primary Examiner — Mahfuzur Rahman
(74) Attorney, Agent, or Firm — Katten Muchin Rosenman LLP

(57) ABSTRACT

An authentication server transmits authentication information used to authenticate the transmission origin of an authentication request, to a sub-authentication server, when receiving the authentication request. The authentication server transmits identification information to identify the sub-authentication server to which the authentication information is transmitted, to a terminal. The terminal includes a transmission destination storage unit that stores identification information to identify the transmission destination of the authentication request and transmits the authentication request to the transmission destination identified with the identification information stored by the transmission destination storage unit. The terminal updates the identification information using the identification information, when receiving the identification information. The sub-authentication server includes an authentication information storage unit that stores the authentication information transmitted from the authentication server to the sub-authentication server, and authenticates the transmission origin of the authentication request using the stored authentication information, when receiving the authentication request.

13 Claims, 25 Drawing Sheets

(56) References Cited

U.S. PATENT DOCUMENTS

| | | | |
|---|---|---|---|
| 7,447,772 B2 | 11/2008 | Natsuno et al. | |
| 7,554,992 B2* | 6/2009 | Kimura et al. | 370/400 |
| 7,748,028 B2* | 6/2010 | Sato et al. | 726/5 |
| 7,877,509 B2* | 1/2011 | Dhupelia et al. | 709/239 |
| 7,953,790 B2* | 5/2011 | Amano et al. | 709/203 |
| 8,020,196 B2* | 9/2011 | Randle et al. | 726/4 |
| 8,195,130 B2* | 6/2012 | Hao et al. | 455/412.1 |
| 8,234,403 B2* | 7/2012 | Richardson et al. | 709/238 |
| 8,312,527 B2* | 11/2012 | Hashimoto | 726/10 |
| 8,332,638 B2* | 12/2012 | Orsini et al. | 713/167 |
| 8,341,278 B2* | 12/2012 | Tewari et al. | 709/229 |
| 2002/0143907 A1 | 10/2002 | Tsurubayashi | |
| 2005/0018853 A1* | 1/2005 | Lain et al. | 380/277 |
| 2005/0289643 A1* | 12/2005 | Sato et al. | 726/4 |
| 2006/0020783 A1* | 1/2006 | Fisher | 713/156 |
| 2007/0136820 A1* | 6/2007 | Saito | 726/27 |
| 2008/0031496 A1* | 2/2008 | Takagi | 382/115 |
| 2009/0265772 A1* | 10/2009 | Hitchcock et al. | 726/7 |

FOREIGN PATENT DOCUMENTS

| | | |
|---|---|---|
| JP | 2002-366365 | 12/2002 |
| JP | 2003-44442 | 2/2003 |
| JP | 2005-142848 | 6/2005 |
| JP | 2006-178879 | 7/2006 |
| JP | 2007-183972 | 7/2007 |
| JP | 2008-217453 | 9/2008 |

OTHER PUBLICATIONS

International Search Report dated Feb. 10, 2009, from corresponding International Application No. PCT/JP2008/069259.

* cited by examiner

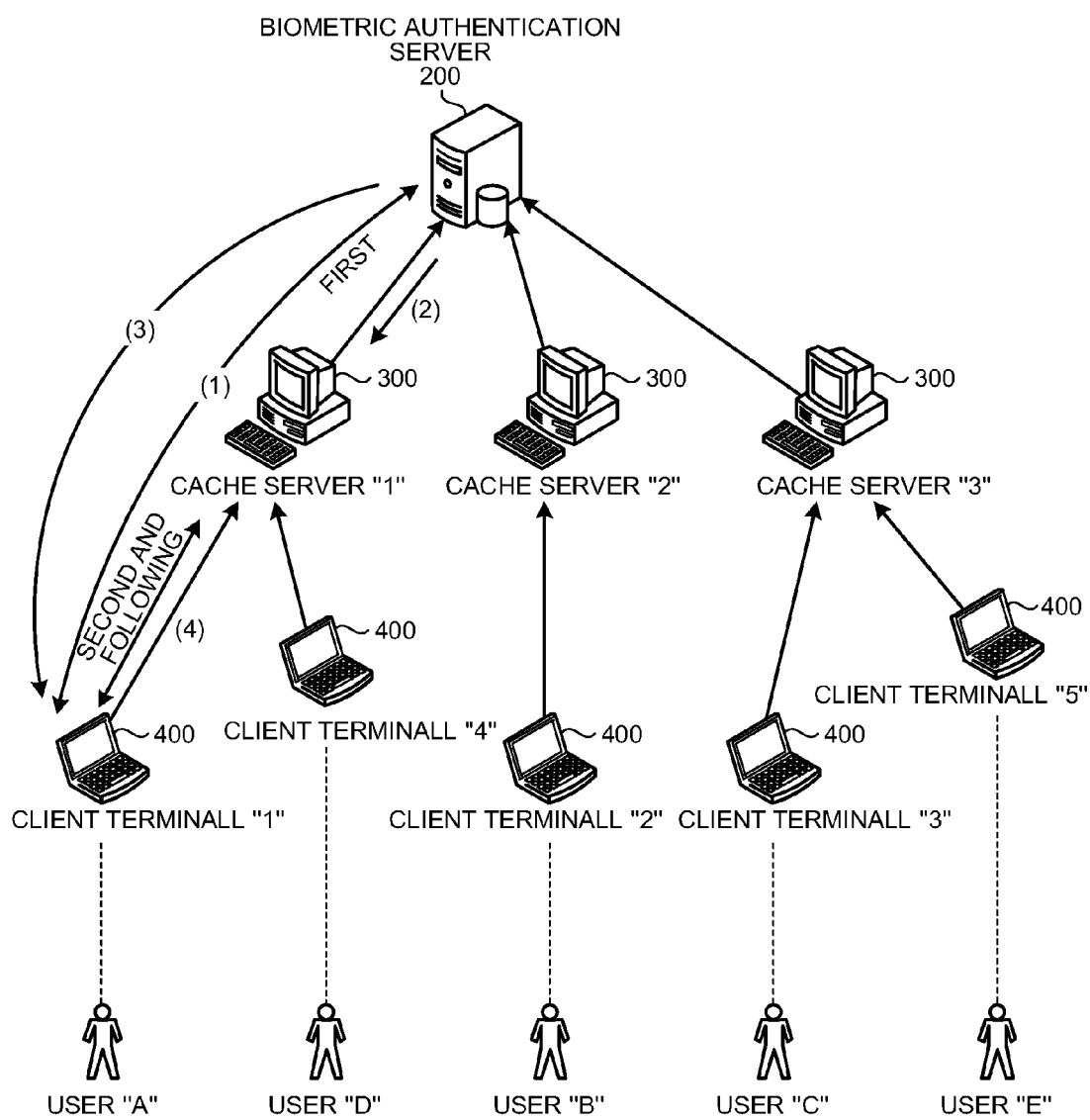

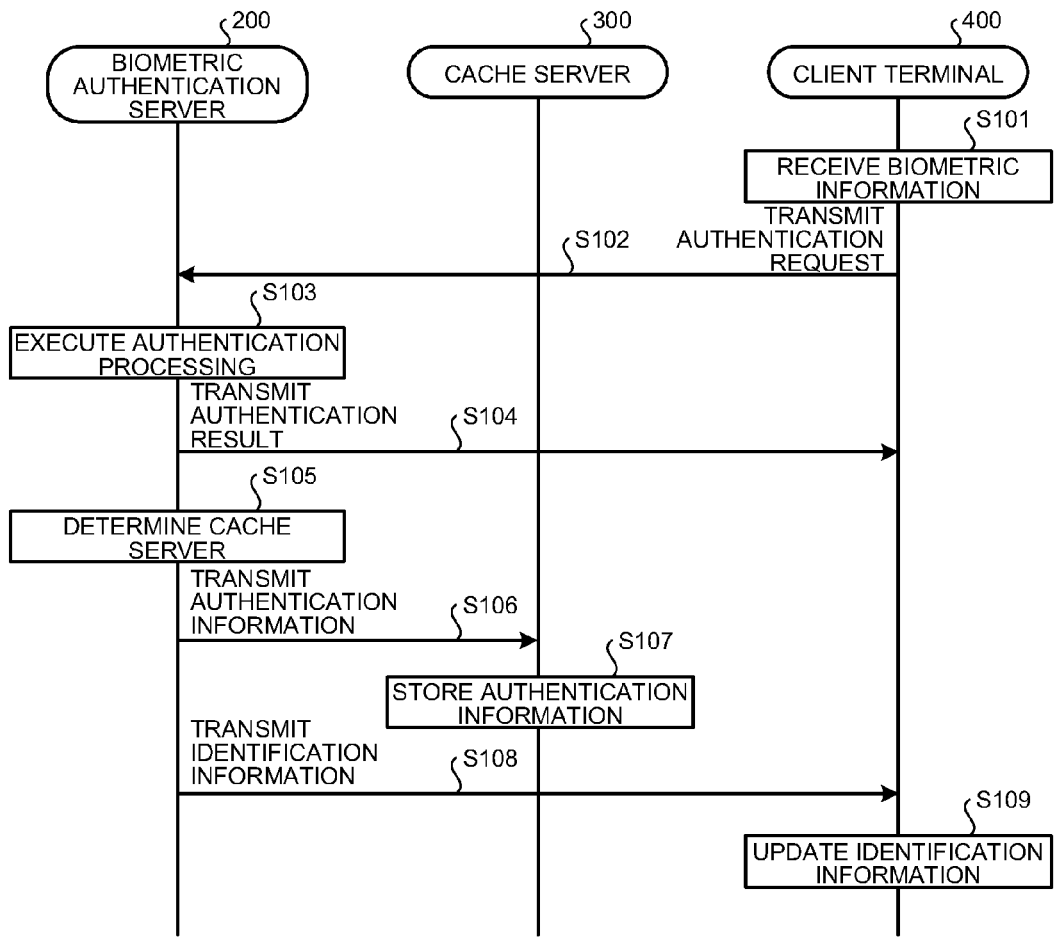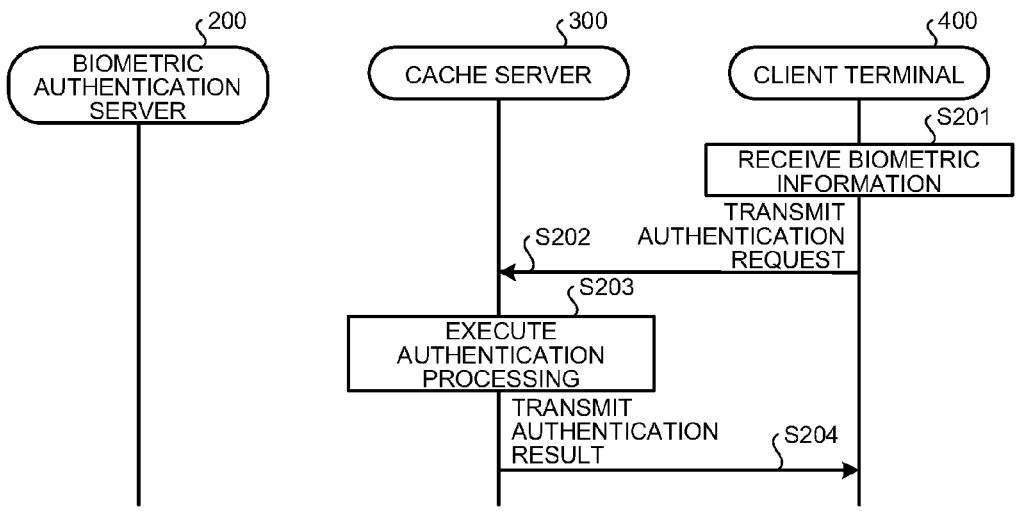

FIG.10

| MANAGEMENT ID | AUTHENTICATION INFORMATION |
|---|---|
| 10001 | X7c6T2r4B3u2G4b1W6a0 |
| 10002 | 6n1o3i7q5w5t8l1h6t5t |
| 10003 | Q3k2G1l9U9s5T8w8O6x0 |
| 10004 | 6n1o3i7q5w5t8l1h6t6t |
| 10005 | Q3k2G1l9U9s5T8w8O6x1 |
| : | : |

FIG.11

| IDENTIFICATION INFORMATION | MANAGEMENT ID |
|---|---|
| 192.168.0.1 | 10001 |
| | 10002 |
| | 10003 |
| 192.168.0.2 | 10004 |
| | 10005 |
| : | : |

FIG.12

| IDENTIFICATION INFORMATION | MANAGEMENT ID | DATE AND TIME | AUTHENTICATION RESULT |
|---|---|---|---|
| 192.168.0.1 | 10001 | 2008/6/13 18:40 | SUCCESS |
| 192.168.0.1 | 10003 | 2008/6/13 17:35 | SUCCESS |
| 192.168.0.2 | 10004 | 2008/6/13 17:35 | SUCCESS |
| 192.168.0.1 | 10003 | 2008/6/13 14:35 | SUCCESS |
| 192.168.0.1 | 10003 | 2008/6/13 14:00 | SUCCESS |
| 192.168.0.1 | 10002 | 2008/6/13 13:10 | SUCCESS |
| 192.168.0.1 | 10003 | 2008/6/13 13:10 | SUCCESS |
| : | : | : | : |

FIG.13

| MANAGEMENT ID | AUTHENTICATION INFORMATION |
|---|---|
| 10001 | X7c6T2r4B3u2G4b1W6a0 |
| 10002 | 6n1o3i7q5w5t8l1h6t5t |
| 10003 | Q3k2G1l9U9s5T8w8O6x0 |

FIG.14

| IDENTIFICATION INFORMATION | LAST UPDATE DATE AND TIME |
|---|---|
| 192.168.0.1 | 2008/5/20 10:00 |

(1)

| IDENTIFICATION INFORMATION | MANAGEMENT ID | USE DATE AND TIME |
|---|---|---|
| 192.168.0.1 | 10001 | 2008/6/13 18:40 |
| 192.168.0.1 | 10003 | 2008/6/13 17:35 |
| 192.168.0.2 | 10004 | 2008/6/13 17:35 |
| 192.168.0.1 | 10003 | 2008/6/13 14:35 |
| 192.168.0.1 | 10003 | 2008/6/13 14:00 |
| 192.168.0.1 | 10002 | 2008/6/13 13:10 |
| 192.168.0.1 | 10003 | 2008/6/13 13:10 |
| : | : | : |

(2)

| IDENTIFICATION INFORMATION | MANAGEMENT ID | USE FREQUENCY | LAST UPDATE DATE AND TIME |
|---|---|---|---|
| 192.168.0.1 | 10001 | 151 | 2008/6/13 18:40 |
| 192.168.0.1 | 10002 | 130 | 2008/6/12 15:00 |
| 192.168.0.1 | 10003 | 10 | 2008/6/13 17:35 |
| 192.168.0.2 | 10004 | 168 | 2008/6/13 17:35 |
| 192.168.0.2 | 10005 | 120 | 2008/6/12 15:00 |
| : | : | : | : |

FIG.23

| MANAGEMENT ID | USER ID | PASSWORD | AUTHENTICATION INFORMATION | VALID PERIOD |
|---|---|---|---|---|
| 10001 | test001 | 0o3l8c4n5p4o3p6q | X7c6T2r4B3u2G4b1W6a0 | 2008/6/20 10:00 |
| 10002 | test002 | J1e4D7k8T5e5Y9l4 | 6n1o3i7q5w5t8l1h6t5t | 2008/6/25 10:00 |
| 10003 | test003 | N0p1N6w2R4l9Z7c0 | Q3k2G1l9U9s5T8w8O6x0 | 2008/7/1 10:00 |

FIG.24

| IDENTIFICATION INFORMATION (FOR UPDATE) | FINAL UPDATE DATE AND TIME |
|---|---|
| 192.168.0.1 | 2008/5/20 10:00 |

| IDENTIFICATION INFORMATION (BIOMETRIC AUTHENTICATION SERVER) |
|---|
| 192.168.0.100 |

AUTHENTICATION SYSTEM, AUTHENTICATION SERVER, AND SUB-AUTHENTICATION SERVER

CROSS-REFERENCE TO RELATED APPLICATION

This application is a continuation of International Application No. PCT/JP2008/069259, filed on Oct. 23, 2008, the entire contents of which are incorporated herein by reference.

FIELD

The embodiments discussed herein are directed to an authentication system, an authentication server, and a sub-authentication server.

BACKGROUND

There is known an authentication system that includes client terminals which transmit an authentication request, and an authentication server which stores authentication information to be used for authentication and executes authentication processing.

There is known a conventional clustering technology for increasing the number of authentication servers to two or more to construct clustering, for the purpose of enhancing the processing capability of an authentication system. According to the clustering technology, when each of the plural authentication servers connected to each other constructs the authentication system, each of the authentication servers is set by a user or a manager, such that each of the authentication servers executes authentication processing as one authentication system.

For example, authentication information is stored for each of the authentication servers by the manager who manages the authentication system. Each of the authentication servers is set for each of the client terminals that transmit an authentication request by the manager or the user.

As another technology that is related to the authentication system, there is known a verification technology where a client device, which includes a fingerprint database to associate an ID and fingerprint information with each other and store an association result, executes the fingerprint verification and then the authentication server executes the fingerprint verification. As another technology that is related to the authentication system, there is known a cache technology where a client device including a cache receives authentication information from the authentication server, stores the authentication information in the cache, and executes authentication processing. Further, there is known a representative technology where login processing with respect to a membership site is executed by a server, instead of a user. Further, there is known a compression technology where compression data obtained by compressing information for authentication using a compression method in which a unique compression result where an original content cannot be restored is generated in advance and an authentication processing device executes authentication processing using the compression data.

Meanwhile, in the clustering technology, there is a problem in that a load of executing the setting processing is imposed on the manager or the like. For example, in the clustering technology, when the setting for the authentication servers using the clustering structure is reconfigured, the authentication system is stopped once, and the manager or the like needs to execute the setting processing again for all of the authentication servers using the clustering structure. Further, the verification technology, the cache technology, the representative technology, or the compression technology is not technologies that can solve the above problem.

Patent Document 1: Japanese Laid-open Patent Publication No. 2001-256191
Patent Document 2: Japanese Laid-open Patent Publication No. 2003-44442
Patent Document 3: Japanese Laid-open Patent Publication No. 2007-183972
Patent Document 4: Japanese Laid-open Patent Publication No. 07-084959

SUMMARY

According to an aspect of an embodiment, an authentication system includes an authentication server that stores authentication information to be used for authentication; a sub-authentication server; and a terminal. The authentication server includes an authentication information transmitting unit that transmits authentication information used to authenticate the transmission origin of an authentication request, to the sub-authentication server, when receiving the authentication request. The authentication server and/or the sub-authentication server includes an identification information transmitting unit that transmits identification information to identify the sub-authentication server to which the authentication information is transmitted by the authentication information transmitting unit, to the terminal that transmits the authentication request. The terminal includes a transmission destination storage unit that stores identification information to identify the transmission destination of the authentication request; an authentication request transmitting unit that transmits the authentication request to the transmission destination identified with the identification information stored by the transmission destination storage unit; and an update unit that updates the identification information stored in the transmission destination storage unit using the identification information transmitted by the identification information transmitting unit, when receiving the identification information. The sub-authentication server includes an authentication information storage unit that stores the authentication information transmitted from the authentication information transmitting unit to the sub-authentication server; and an authentication unit that authenticates the transmission origin of the authentication request using the authentication information stored in the authentication information storage unit, when receiving the authentication request.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a diagram illustrating an outline of an authentication system according to a first embodiment;

FIG. 2 is a sequence diagram illustrating an example of a flow of first authentication processing in the authentication system according to the first embodiment;

FIG. 3 is a sequence diagram illustrating an example of a flow of second and following authentication processing in the authentication system according to the first embodiment;

FIG. 10 is a diagram illustrating an example of information that is stored by an NS authentication information storage unit in the first embodiment;

FIG. 11 is a diagram illustrating an example of information that is stored by an NS identification information storage unit in the first embodiment;

FIG. 12 is a diagram illustrating an example of information that is stored by an NS log storage unit in the first embodiment;

FIG. 13 is a diagram illustrating an example of information that is stored by a CS cache in the first embodiment;

FIG. 14 is a diagram illustrating an example of information that is stored by a CL identification information storage unit in the first embodiment;

FIG. 23 is a diagram illustrating an example of information that is stored in an NS authentication information storage unit or a CS cache in a fifth embodiment;

FIG. 24 is a diagram illustrating an example of information that is stored in a CL identification information storage unit in the fifth embodiment;

DESCRIPTION OF EMBODIMENTS

Figure 4:
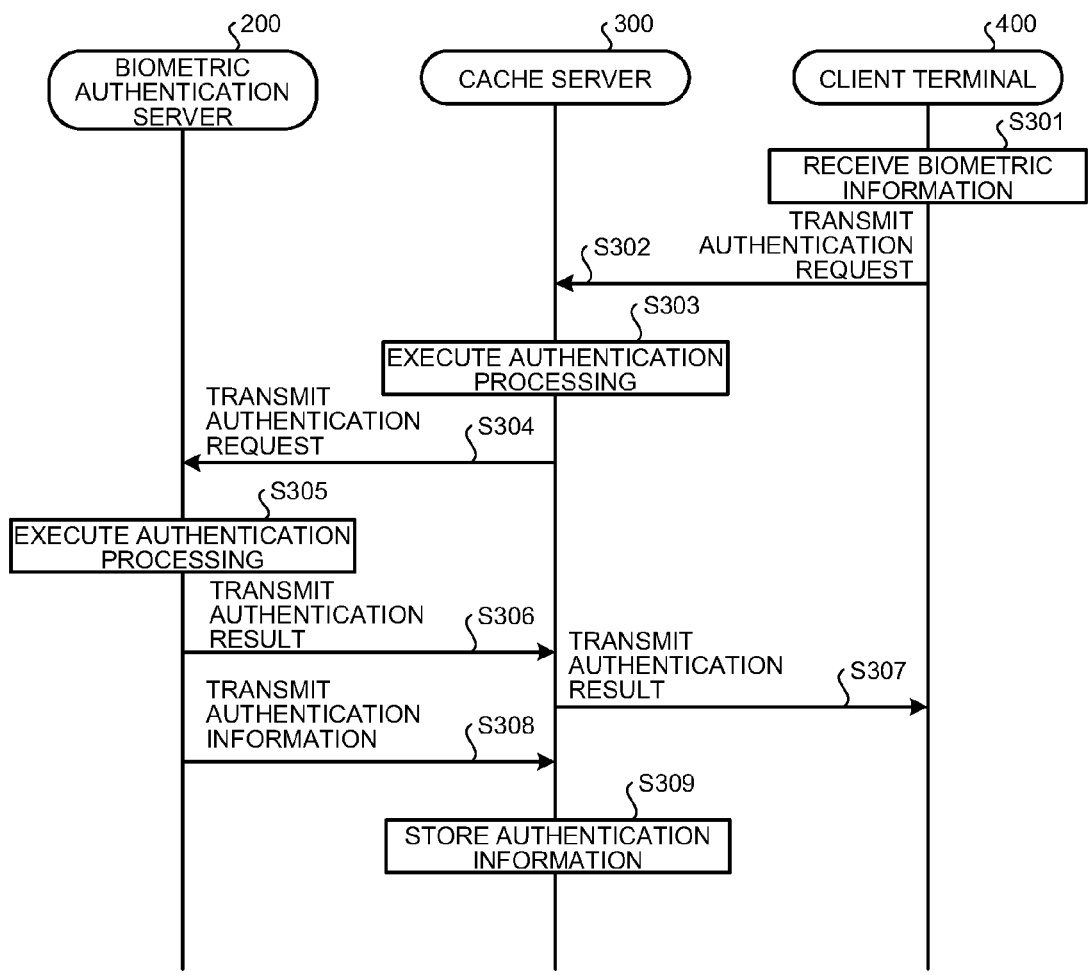
FIG. 4 is a sequence diagram illustrating an example of a flow of second and following authentication processing in the authentication system according to the first embodiment.

Preferred embodiments of the present invention will be explained with reference to accompanying drawings. Further, an outline of an authentication system, a flow of processing of an authentication system, and a configuration thereof according to this embodiment will be sequentially described below, and then the other embodiments will be described.

[a] First Embodiment

Outline of an Authentication System

First, the outline of the authentication system according to the first embodiment will be described using FIG. 1. FIG. 1 is a diagram illustrating the outline of the authentication system according to the first embodiment.

As illustrated in FIG. 1, in the authentication system according to the first embodiment, a biometric authentication server 200 (also called an authentication server) that stores authentication information to be used for authentication receives an authentication request from a client terminal 400 (also called a terminal). For example, as illustrated in (1) of FIG. 1, the biometric authentication server 200 receives an authentication request "A" from a client terminal "1" that receives biometric information from a user "A".

The biometric authentication server 200 transmits authentication information that is used to authenticate the transmission origin of the authentication request, to a cache server 300 (also called a sub-authentication server). For example, as illustrated in (2) of FIG. 1, the biometric authentication server 200 transmits authentication information that is used to authenticate the authentication request "A", to the cache server "1".

The biometric authentication server 200 transmits identification information to identify the cache server 300 to which the authentication information is transmitted, to the client terminal 400 that transmits the authentication request. For example, as illustrated in (3) of FIG. 1, the biometric authentication server 200 transmits identification information to identify the cache server "1" to the client terminal "1".

In this case, in the authentication system according to the first embodiment, the client terminal 400 includes a CS identification information storage unit (also called a transmission destination storage unit) that stores identification information to identify the transmission destination of the authentication request, and transmits the authentication request to the transmission destination identified with the authentication information stored in the corresponding storage unit. If the client terminal 400 receives the identification information transmitted by the biometric authentication server 200, the client terminal 400 updates the identification information stored in the CS identification information storage unit using the received identification information.

As a result, as illustrated in (4) of FIG. 1, the client terminal 400 transmits the authentication request to the cache server 300, using the identification information transmitted by the biometric authentication server 200. For example, the client terminal "1" transmits the first authentication request to the biometric authentication server 200 and transmits the second and following authentication requests to the cache server "1".

In the authentication system according to the first embodiment, the cache server 300 authenticates the transmission origin of the authentication request, using the authentication information transmitted by the biometric authentication server 200. The transmission origin of the authentication request corresponds to the client terminal 400 transmitting the authentication request or a user who uses the client terminal 400.

From this configuration, the authentication system according to the first embodiment can alleviate the load of setting processing while enhancing the processing capability of the authentication system. Specifically, since the authentication processing is executed by the cache server 300 as well as the biometric authentication server 200, the processing capability of the authentication system can be enhanced. The setting processing that is needed when the cache server 300 is added can be automated and the load of the setting processing can be alleviated.

Processing Executed in the Authentication System According to First Embodiment

Next, each processing that is executed in the authentication system according to the first embodiment will be described using FIGS. 2 to 8. First, a flow of the first authentication processing and flows of the second and following authentication processing in the authentication system will be simply described using sequence diagrams illustrated in FIGS. 2 to 4. The second and following authentication processing is authentication processing that is related to second and following authentication requests transmitted by the same client terminal 400.

A flow of cache server registration processing in the authentication system will be described using a flowchart illustrated in FIG. 5. The cache server registration processing is processing to register the cache server 300 used in the authentication system, with respect to the biometric authentication server 200.

Next, the flow of the first authentication processing and the flows of the second and following authentication processing in the authentication system will be described in detail using flowcharts illustrated in FIGS. 6 and 7. Then, a flow of cache server determination processing in the authentication system will be descried using a flowchart illustrated in FIG. 8. The cache server determination processing is processing to determine the cache server 300 to be used, when the plural cache servers 300 are registered in the biometric authentication server 200.

In the description below, it is assumed that the number of cache servers 300 or the number of client terminals 400 is plural, unless mentioned otherwise. For example, the plural cache servers 300 are described as the cache server "1" and the cache server "2", and the plural client terminals 400 are described as the client terminal "1" and the client terminal "2". In the description below, it is assumed that the client terminal "1" transmits the authentication request, unless mentioned otherwise.

In the description below, it is assumed that the client terminal 400 transmits an authentication request "A" to request for authentication processing with respect to fingerprint information "A" and an authentication request "B" to request for authentication processing with respect to fingerprint information "B". Further, it is assumed that the authentication request includes information to identify the client terminal 400 that transmits the authentication request.

In the description below, it is assumed that the fingerprint information is used as an example of biometric information, unless mentioned otherwise. However, information that is used as the biometric information is not limited to the fingerprint information and may be information on an iris, a palm vein, a finger vein, a voiceprint, a face form, a handwriting, and the like.

When each processing executed in the authentication system is described, the detailed description of each unit (refer to FIG. 9) in a management terminal 100, the biometric authentication server 200, the cache server 300, and the client terminal 400 will be appropriately omitted. The configuration of the authentication system will be described below using FIG. 9.

Flow of the First Authentication Processing (Case where Authentication Processing is Executed in the Biometric Authentication Server)

First, an example of the flow of the first authentication processing in the authentication system according to the first embodiment will be simply described using FIG. 2. FIG. 2 is a sequence diagram illustrating an example of the flow of the first authentication processing in the authentication system according to the first embodiment. The case where the authentication processing is executed in the biometric authentication server 200 will be described using FIG. 2.

As illustrated in FIG. 2, if the client terminal 400 receives biometric information from a user who uses the client terminal 400 (step S101), the client terminal 400 transmits the authentication request to the biometric authentication server 200 (step S102). For example, if the client terminal "1" receives the fingerprint "A" as the biometric information from the user "A", the client terminal "1" transmits the authentication request "A" to the biometric authentication server 200.

In this case, the client terminal 400 includes a CL identification information storage unit 411 (refer to FIG. 9) that stores identification information to identify a transmission destination of the transmission request, and the CL identification information storage unit 411 previously stores the identification information to identify the biometric authentication server 200. The client terminal 400 transmits the authentication request using the identification information stored in the CL identification information storage unit 411. Specifically, when the client terminal 400 first transmits the authentication request, the client terminal 400 transmits the authentication request to the biometric authentication server 200, using the identification information to identify the biometric authentication server 200 previously stored in the CL identification information storage unit 411.

The biometric authentication server 200 receives the authentication request from the client terminal 400 and executes authentication processing (step S103). Specifically, the biometric authentication server 200 includes an NS authentication information storage unit 211 (refer to FIG. 9) that stores the authentication information used in the authentication processing, and executes the authentication processing using the authentication information stored in the NS authentication information storage unit 211. For example, the biometric authentication server 200 executes the authentication processing on the fingerprint information "A".

In the description below, it is assumed that a one-to-many identification method is used for the authentication processing, unless mentioned otherwise. The one-to-many identification method is a method that identifies biometric information received from the user and all of authentication information (also called a one-to-many population) becoming verification objects, without using information to identify a user, such as a user ID. Specifically, in the one-to-many identification method, the biometric authentication server 200 determines an authentication processing result as an authentication success, when there is authentication information where a degree of similarity matched with the biometric information is more than a threshold value as a verification result. The biometric authentication server 200 determines the authentication processing result as an authentication failure, when there is no authentication information where a degree of similarity matched with the biometric information is more than a threshold value as the verification result. For example, in the biometric authentication server 200, all of the authentication information that is stored in the NS authentication information storage unit 211 becomes the one-to-many population.

In this case, the biometric authentication server 200 transmits the authentication processing result to the client terminal 400 (step S104). For example, the biometric authentication server 200 transmits the authentication result indicating that the authentication with respect to the fingerprint information "A" succeeds as the authentication result, to the client terminal "1".

The biometric authentication server 200 determines the cache server 300 (step S105). That is, the biometric authentication server 200 determines the cache server 300 that executes the authentication processing with respect to the authentication request to be transmitted hence from the client terminal 400 becoming the transmission origin of the authentication request. For example, the biometric authentication server 200 determines the cache server "1".

The biometric authentication server 200 transmits the authentication information to the determined cache server 300 (step S106). Specifically, the biometric authentication server 200 transmits the authentication information that is included in the authentication information stored in the NS authentication information storage unit 211 and is used to authenticate the authentication request received from the client terminal 400. For example, the biometric authentication server 200 transmits the authentication information that is used to authenticate the fingerprint information "A", to the cache server "1".

Then, if the cache server 300 receives the authentication information from the biometric authentication server 200, the cache server 300 stores the authentication information (step S107). Specifically, the cache server 300 includes a CS cache 311 (refer to FIG. 9) that stores the authentication information received from the biometric authentication server 200, and stores the received authentication information in the CS cache 311. For example, the cache server "1" stores the authentication information that is used to authenticate the fingerprint information "A", in the CS cache 311.

The biometric authentication server 200 transmits the identification information to identify the determined cache server 300 to the client terminal 400 (step S108). For example, the biometric authentication server 200 transmits identification information to identify the cache server "1" to the client terminal "1".

In the description below, the identification information "1" or the identification information "2" is used as the identification information to identify the cache server 300. For example, the identification information "1" or the identification information "2" is information to identify the cache server 300 "1" or "2".

Then, if the client terminal 400 receives the identification information from the biometric authentication server 200, the client terminal 400 updates the identification information that is stored in the CL identification information storage unit 411 (step S109). That is, the client terminal 400 updates the identification information stored in the CL identification information storage unit 411 from the identification information to identify the biometric authentication server 200 to the identification information to identify the cache server 300. For example, the client terminal 400 updates the identification information with identification information "1".

That is, when the client terminal 400 transmits the authentication request, the client terminal 400 transmits the authentication request using the identification information to identify the cache server 300. For example, the client terminal 400 transmits the authentication request to the cache server "1", not the biometric authentication server 200.

With respect to each processing executed in steps S105, S106, and S108 described above, the biometric authentication server 200 executes each processing asynchronously with step S104. For example, the biometric authentication server 200 may execute each processing at the same time as step S104 described above or execute each processing in order different from the order described in FIG. 1.

Flow of the Second and Following Authentication Processing (Case where the Authentication Processing is Executed in the Cache Server)

Next, the flow of the second and following authentication processing in the authentication system according to the first embodiment will be simply described using FIG. 3. FIG. 3 is a sequence diagram illustrating an example of the flow of the second and following authentication processing in the authentication system according to the first embodiment.

The second and following authentication processing is authentication processing that is related to the second and following authentication requests transmitted by the same client terminal 400. Specifically, the second and following authentication processing is authentication processing in the case where the CL identification information storage unit 411 stores the identification information to identify the cache server 300, using the processing described in the sequence diagram of FIG. 2. The case where the authentication processing is executed in the cache server 300 will be described using FIG. 3.

As illustrated in FIG. 3, if the client terminal 400 receives the biometric information from the user (step S201), the client terminal 400 transmits the authentication request to the cache server 300 (step S202). For example, if the client terminal "1" receives the fingerprint information "A" from the user "A", the client terminal "1" transmits the authentication request "A" to the cache server "1".

If the cache server 300 receives the authentication request from the client terminal 400, the cache server 300 executes the authentication processing (step S203). Specifically, the cache server 300 executes the authentication processing using the authentication information that is stored in the CS cache 311. That is, the cache server 300 executes the authentication processing using the authentication information stored in the CS cache 311 as the one-to-many population.

In this case, the cache server 300 transmits the authentication processing result to the client terminal 400 (step S204). For example, the cache server 300 transmits the authentication result indicating that the authentication with respect to the fingerprint information "A" succeeds, to the client terminal 1.

Flow of the Second and Following Authentication Processing (Case where the Authentication Processing is Executed in the Biometric Authentication Server)

Next, the flow of the second and following authentication processing in the authentication system according to the first embodiment will be simply described using FIG. 4. FIG. 4 is a sequence diagram illustrating an example of the flow of the second and following authentication processing in the authentication system according to the first embodiment. The case where the authentication fails in the cache server 300 and the authentication succeeds in the biometric authentication server 200 will be described using FIG. 4.

As illustrated in FIG. 4, if the client terminal 400 receives the biometric information from the user (step S301), the client terminal 400 transmits the authentication request to the cache server 300 (step S302). For example, if the client terminal "1" receives the fingerprint information "B" from the user "B", the client terminal "1" transmits the authentication request "B" to the cache server "1".

If the cache server 300 receives the authentication request from the client terminal 400, the cache server 300 executes the authentication processing (step S303). When the authentication fails as the result of the authentication processing, the cache server 300 transmits the authentication request to the biometric authentication server 200 (step S304).

Here, the case where the authentication fails in the cache server 300 will be described. As described using the sequence diagram illustrated in FIG. 3, the client terminal 400 transmits the authentication request to the cache server 300 where the authentication information corresponding to the previously transmitted authentication request is stored in the CS cache 311. However, the client terminal 400 may request to execute the authentication processing with respect to the biometric information different from the biometric information previously requested to be authenticated, as the authentication request. For example, the client terminal 400 receives biometric information from a user different from the user from which the biometric information is received when the authentication request is previously transmitted. Specifically, this case corresponds to the case where the biometric information "A" is received from the user "A" when the authentication request is previously transmitted and the biometric information "B" is received from the user "B" this time. As a result, in the case where the CS cache 311 stores only the authentication information used when the fingerprint information "A" is authenticated, the cache server 300 cannot authenticate the fingerprint information "B" and the authentication fails.

The case where the cache server 300 does not transmit the authentication processing result in the cache server 300 to the client terminal 400 as it is and transmits the authentication request to the biometric authentication server 200 will be described. The cache server 300 executes the authentication processing using the authentication information stored in the CS cache 311 as the one-to-many population. In this case, the CS cache 311 stores the authentication information that is received from the biometric authentication server 200, that is, stores a part of the authentication information that is stored by the NS authentication information storage unit 211. That is, even when the authentication fails as the result of the authentication processing in the cache server 300, the authentication may succeed as the result of the authentication processing using the authentication information that is stored in the NS authentication information storage unit 211. For this reason, in the authentication system according to the first embodiment, the cache server 300 does not transmit the authentication processing result in the cache server 300 to the client terminal 400 as it is and transmits the authentication request to the biometric authentication server 200, and the authentication processing is executed in the biometric authentication server 200.

Returning to the description of FIG. 4, if the biometric authentication server 200 receives the authentication request from the cache server 300, the biometric authentication server 200 executes the authentication processing (step S305). The biometric authentication server 200 transmits the authentication result to the cache server 300 (step S306). For example, the biometric authentication server 200 transmits the authentication result indicating that the authentication with respect to the fingerprint information "B" succeeds, as the authentication result.

Then, if the cache server 300 receives the authentication result from the biometric authentication server 200, the cache server 300 transmits the authentication result to the client terminal 400 (step S307). For example, the cache server 300 transmits the authentication result to the client terminal "1".

If the authentication processing succeeds, the biometric authentication server 200 transmits the authentication information to the cache server 300 that becomes the transmission origin of the authentication request (step S308).

Then, if the cache server 300 receives the authentication information from the biometric authentication server 200, the cache server 300 stores the authentication information in the CS cache 311 (step S309). For example, the cache server 300 stores the authentication information that is used when the fingerprint information "B" is authenticated, in the CS cache 311.

Flow of Enrollment Processing at the Time of Registering the Cache Server

Next, the flow of the enrollment processing at the time of registering the cache server in the authentication system according to the first embodiment will be described using FIG. 5. That is, processing to register the cache server 300 used in the authentication system with respect to the biometric authentication server 200 will be described. FIG. 5 is a flowchart illustrating an example of the flow of the enrollment processing at the time of registering the cache server in the authentication system according to the first embodiment.

Figure 5:
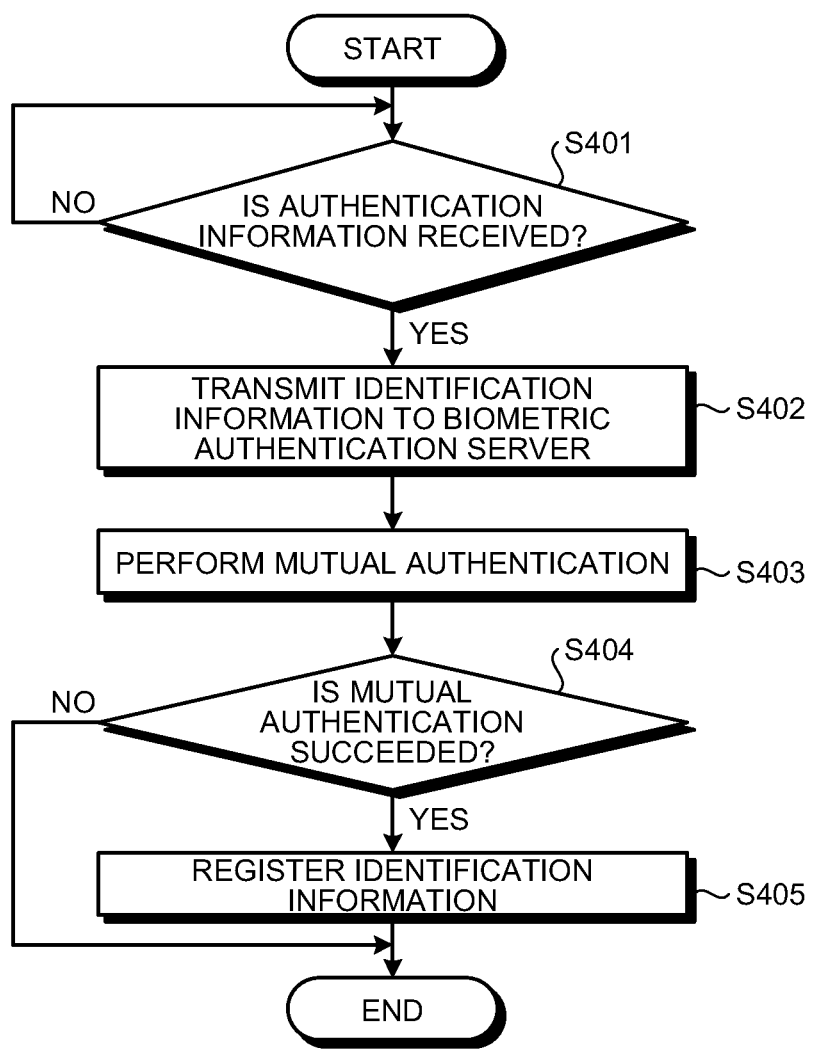
FIG. 5 is a flowchart illustrating an example of a flow of authentication processing at the time of registering a cache server in the authentication system according to the first embodiment.

As illustrated in FIG. 5, in the management terminal 100, an M cache server managing unit 101 (refer to FIG. 9) receives identification information to identify the cache server 300, from a manager who manages the authentication system (step S401: YES). The M cache server managing unit 101 transmits the identification information to the biometric authentication server 200 (step S402). For example, the M cache server managing unit 101 receives the identification information "1" from the manager and transmits the identification information "1" to the biometric authentication server 200.

Then, in the biometric authentication server 200, if an NS server authentication unit 221 (refer to FIG. 9) receives the identification information from the M cache server managing unit 101, the NS server authentication unit 221 executes mutual authentication (step S403). Specifically, the NS server authentication unit 221 executes the mutual authentication with a CS server authentication unit 321 (refer to FIG. 9) in the cache server 300 identified with the received identification information. For example, if the NS server authentication unit 221 receives the identification information "1", the NS server authentication unit 221 executes the mutual authentication with the CS server authentication unit 321 in the cache server "1".

The mutual authentication means that the biometric authentication server 200 and the cache server 300 execute the mutual authentication. Specifically, the biometric authentication server 200 authenticates the cache server 300 identified with the identification information to be the legitimate cache server 300. The cache server 300 authenticates the biometric authentication server 200 to be the legitimate biometric authentication server 200.

In this case, in the biometric authentication server 200, if the mutual authentication succeeds (step S404: YES), the NS server authentication unit 221 registers the identification information that is received from the M cache server managing unit 101 (step S405) and ends the processing. Specifically, the biometric authentication server 200 includes an NS identification information storage unit 212 (refer to FIG. 9) that stores information on the cache server 300. The biometric authentication server 200 stores the identification information to identify the cache server 300 where the mutual authentication succeeds, in the NS identification information storage unit 212.

Meanwhile, in the biometric authentication server 200, if the mutual authentication fails (step S404: NO), the NS server authentication unit 221 does not register the identification information and ends the processing.

Flow of the First Authentication Processing

Next, the flow of the first authentication processing in the authentication system according to the first embodiment will be described in detail with reference to FIG. 6. FIG. 6 is a flowchart illustrating an example of the flow of the first authentication processing in the authentication system according to the first embodiment.

In the description below, it is assumed that the CS cache 311 stores identification information used when the fingerprint information "A" is authenticated and does not store identification information used when the fingerprint information "B" or the fingerprint information "C" is authenticated, unless mentioned otherwise. That is, in the cache server 300, when the authentication request "A" is received, the authentication succeeds, and when the authentication request "B" or the authentication request "C" is received, the authentication fails.

In the description below, it is assumed that the NS authentication information storage unit 211 stores identification information used when the fingerprint information "A" and the fingerprint information "B" are authenticated and does not store identification used when the fingerprint information "C" is authenticated, unless mentioned otherwise. That is, in the biometric authentication server 200, when the authentication request "A" or the authentication request "B' is received, the authentication succeeds, and when the authentication request "C" is received, the authentication fails.

Figure 6:
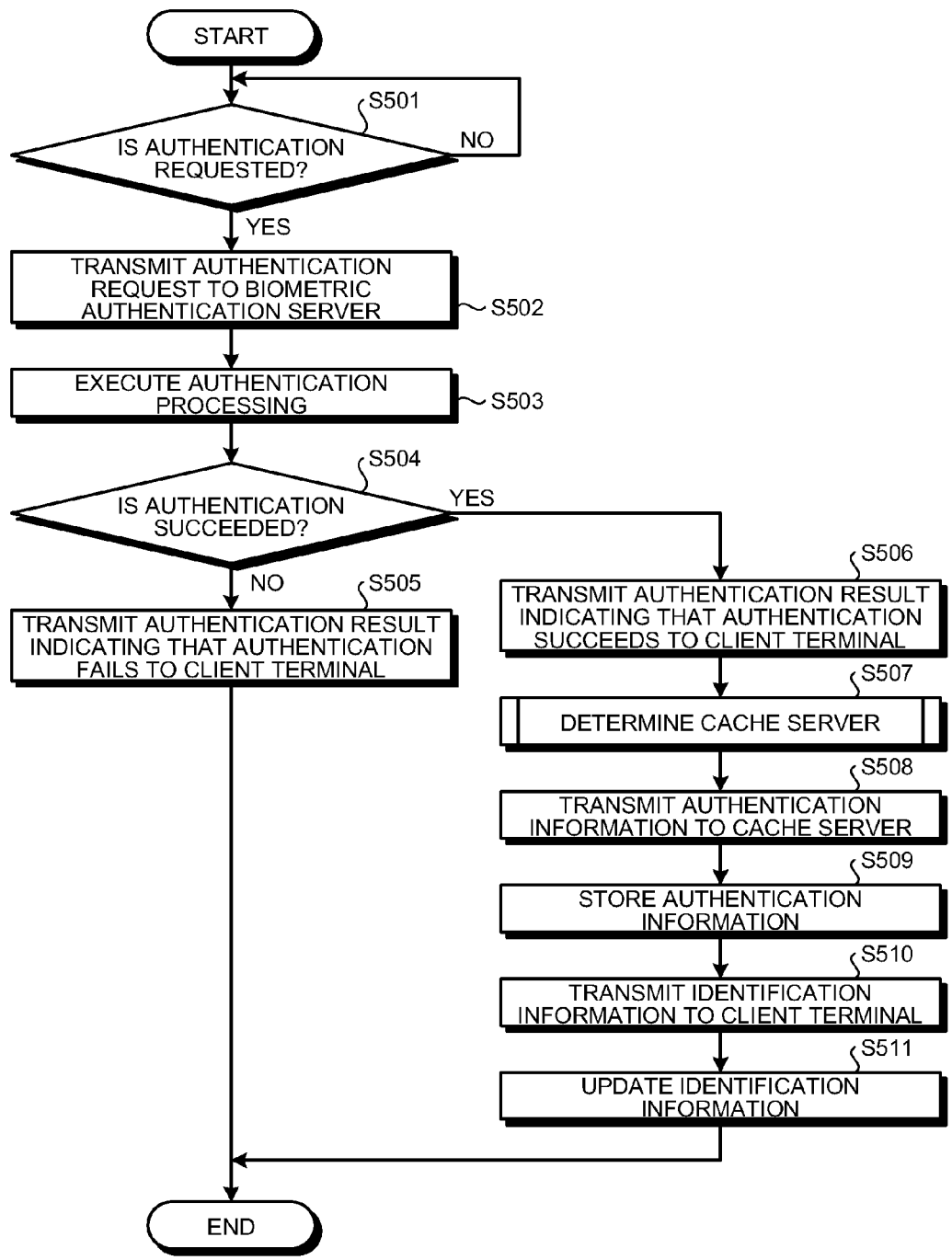
FIG. 6 is a flowchart illustrating an example of a flow of first authentication processing in the authentication system according to the first embodiment.

As illustrated in FIG. 6, in the client terminal 400, if the authentication is requested (step S501: YES), a CL authentication request transmitting unit 422 (refer to FIG. 9) transmits the authentication request to the biometric authentication server 200 (step S502). That is, the CL authentication request transmitting unit 422 transmits the authentication request to the biometric authentication server 200, using the identification information to identify the biometric authentication server 200 previously stored in the CL identification information storage unit 411. In this case, the case where a CL biometric information receiving unit 421 (refer to FIG. 9) receives biometric information from the user, for example, the case where the CL biometric information receiving unit 421 receives the fingerprint information "A" from the user "A" corresponds to when the authentication is requested.

Then, if the biometric authentication server 200 receives the authentication request transmitted by the CL authentication request transmitting unit 422, an NS authentication unit 222 (refer to FIG. 9) executes the authentication processing using the authentication information stored in the NS authentication information storage unit 211 (step S503). Specifically, the NS authentication unit 222 verifies each piece of authentication information stored in the NS authentication information storage unit 211 and the biometric information designated by the authentication request. The NS authentication unit 222 determines that the authentication succeeds, when there is authentication information where a degree of matching is more than a threshold value as a verification result. The NS authentication unit 222 determines that the authentication fails, when there is no authentication information where a degree of matching is more than a threshold value as the verification result. For example, the NS authentication unit 222 executes the authentication processing with respect to the fingerprint information "A" or the fingerprint information "C".

In this case, in the biometric authentication server 200, if the NS authentication unit 222 determines that the authentication fails (step S504: NO), an NS authentication result notifying unit 223 (refer to FIG. 9) transmits the authentication result indicating that the authentication fails to the client terminal 400 (step S505). Specifically, the NS authentication result notifying unit 223 receives the authentication result indicating that the authentication fails and information to identify the transmission origin of the authentication request, from the NS authentication unit 222. The NS authentication result notifying unit 223 transmits the authentication result using the information to identify the transmission origin of the authentication request.

For example, when the NS authentication unit 222 fails in authenticating the authentication request "C" from the client terminal "1", the NS authentication result notifying unit 223 receives the authentication result indicating that the authentication with respect to the fingerprint information "C" fails and information indicating that the transmission origin is the client terminal "1", from the NS authentication unit 222. The NS authentication result notifying unit 223 transmits the authentication result indicating that the authentication with respect to the fingerprint information "C" fails to the client terminal "1". In the client terminal 400, a CL authentication result reception processing unit 424 receives the authentication result from the NS authentication result notifying unit 223 (refer to FIG. 9).

Meanwhile, in the biometric authentication server 200, if the authentication of the NS authentication unit 222 succeeds (step S504: YES), the NS authentication result notifying unit 223 transmits the authentication result indicating that the authentication succeeds, to the client terminal 400 (step S506). For example, in the biometric authentication server 200, when the NS authentication unit 222 succeeds in authenticating the authentication request "A" from the client terminal "1", the NS authentication result notifying unit 223 transmits the authentication result indicating that the authentication with respect to the fingerprint information "A" succeeds to the client terminal "1".

The biometric authentication server 200 determines the used cache server 300 from the plural cache servers 300 (step S507). For example, the biometric authentication server 200 determines the cache server "1". Specifically, the biometric authentication server 200 selects any one piece of the identification information stored in the NS identification information storage unit 212 and determines the used cache server. Step S507 is described in detail using FIG. 8.

In the biometric authentication server 200, an NS setting unit 224 (refer to FIG. 9) transmits the authentication information to the cache server 300 (step S508). Specifically, the NS setting unit 224 receives the authentication result indicating that the authentication succeeds, from the NS authentication unit 222. The NS setting unit 224 transmits the authentication information that is used at the time of authenticating the authentication request received from the client terminal 400, in the authentication information stored in the NS authentication information storage unit 211. The NS setting unit 224 receives the information to identify the transmission origin of the authentication request, from the NS authentication unit 222, and transmits the authentication information. The NS authentication unit 224 also transmits a management ID to identify the authentication information used at the time of authenticating the authentication request received from the client terminal 400.

The management ID is information to identify the identification information and the same management ID is used to identify the same authentication information in the biometric authentication server 200 or the cache server 300.

For example, when the NS setting unit 224 receives the authentication result indicating that the authentication with respect to the fingerprint information "A" succeeds, the NS setting unit 224 transmits the authentication information used at the time of authenticating the fingerprint information "A" and the management ID to the cache server 300 becoming the transmission origin of the authentication request. For example, the NS setting unit 224 transmits the authentication information and the management ID to the cache server "1".

Then, in the cache server 300, if a CS cache managing unit 324 (refer to FIG. 9) receives the authentication information, the cache server 300 stores the authentication information in the CS cache 311 (step S509). For example, in the cache server "1", the CS cache managing unit 324 receives the authentication information used at the time of authenticating the fingerprint information "A" and the management ID and stores the authentication information and the management ID in the CS cache 311.

In the biometric authentication server 200, the NS setting unit 224 transmits identification information to identify the determined cache server 300 to the client terminal 400 (step S510). Specifically, the NS setting unit 224 receives the information to identify the transmission origin of the authentication request, from the NS authentication unit 222, and transmits the identification information using the information to identify the transmission origin of the authentication request. For example, the NS setting unit 224 transmits the identification information "1" to the client terminal "1".

As described above, the cache server 300 is determined when the NS authentication unit 222 receives the authentication request from the CL authentication request transmitting unit 422. As a result, the NS setting unit 224 receives information to identify the client terminal 400 as the information to identify the transmission origin of the authentication request, and transmits the identification information to identify the cache server 300 to the client terminal 400.

Then, in the client terminal 400, if a CL identification information managing unit 423 (refer to FIG. 9) receives the identification information transmitted by the NS setting unit 224, the CL identification information managing unit 423 updates the identification information that is stored in the CL identification information storage unit 411 (step S511). For example, the CL identification information managing unit 423 updates the identification information stored in the CL identification information storage unit 411 with the identification information "1".

Flow of the Second and Following Authentication Processing

Next, the flow of the second and following authentication processing in the authentication system according to the first embodiment will be described in detail using FIG. 7. FIG. 7 is a flowchart illustrating an example of the flow of the second and following authentication processing in the authentication system according to the first embodiment.

Figure 7:
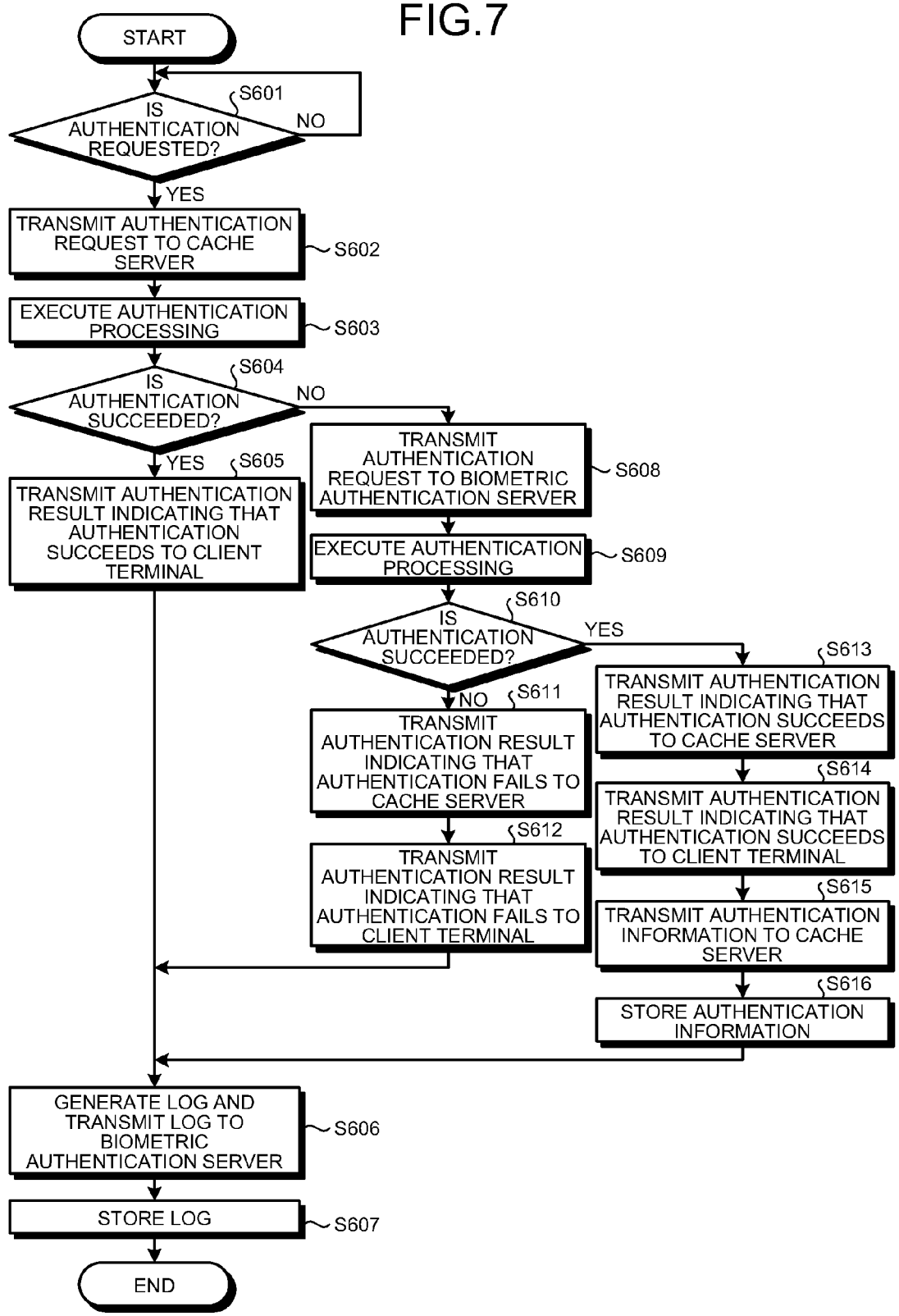
FIG. 7 is a flowchart illustrating an example of a flow of second and following authentication processing in the authentication system according to the first embodiment.

As illustrated in FIG. 7, in the client terminal 400, if the authentication is requested (step S601: YES), the CL authentication request transmitting unit 422 transmits the authentication request to the cache server 300 (step S602). That is, the CL identification information storage unit 411 stores the identification information that is updated by the CL identification information managing unit 423 and is used to identify the cache server 300. The CL authentication request transmitting unit 422 transmits the authentication request to the cache server 300, using the identification information to identify the cache server 300 stored in the CL identification information storage unit 411. For example, the CL authentication request transmitting unit 422 transmits the authentication request "A" to the cache server "1", using the identification information "1" stored in the CL identification information storage unit 411.

Then, if the cache server 300 receives the authentication request transmitted by the CL authentication request transmitting unit 422, a CS authentication unit 322 (refer to FIG. 9) executes the authentication processing (step S603). Specifically, the CS authentication unit 322 executes the authentication processing using the authentication information that is stored in the CS cache 311. For example, when the CS authentication unit 322 receives the authentication request "A", the CS authentication unit 322 executes the authentication processing with respect to the fingerprint information "A".

In this case, in the cache server 300, if the CS authentication unit 322 executes the authentication processing (step S604: YES), a CS authentication result notifying unit 323 (refer to FIG. 9) transmits the authentication result indicating that the authentication succeeds to the client terminal 400 (step S605). For example, if the CS authentication unit 322 authenticates the authentication request "A", the CS authentication result notifying unit 323 transmits the authentication result indicating that the authentication with respect to the fingerprint information "A" succeeds to the client terminal 400. In the client terminal 400, the CL authentication result reception processing unit 424 receives the authentication result from the CS authentication result notifying unit 323.

In the cache server 300, a CS log data generating unit 325 (refer to FIG. 9) generates a log and transmits the log to the biometric authentication server 200 (step S606). For example, the CS log data generating unit 325 transmits identification information to identify the cache server 300, a management ID with respect to the authentication information used by the CS authentication unit 322, and a time when the authentication processing is executed by the CS authentication unit 322 as the log to the biometric authentication server 200.

Then, in the biometric authentication server 200, an NS log data reception processing unit 225 (refer to FIG. 9) stores the log that is transmitted by the CS log data generating unit 325 (step S607). Specifically, the biometric authentication server 200 includes an NS log storage unit 213 (refer to FIG. 9) that stores the log, and the NS log data reception processing unit 225 stores the log that is transmitted by the CS log data generating unit 325, in the NS log storage unit 213.

Meanwhile, in the cache server 300, if the authentication fails (step S604: NO), the CS authentication unit 322 transmits the authentication request that is received from the client terminal 400, to the biometric authentication server 200 (step S608). For example, if the authentication with respect to the fingerprint information "B" fails, the CS authentication unit 322 transmits the authentication request "B" to the biometric authentication server 200.

Then, in the biometric authentication server 200, if the NS authentication unit 222 receives the authentication request from the CS authentication unit 322, the NS authentication unit 222 executes the authentication processing (step S609). Specifically, the NS authentication unit 222 executes the authentication processing using the authentication information that is stored in the NS authentication information storage unit 211. For example, the NS authentication unit 222 receives the authentication request "B" or the authentication request "C" and executes the authentication processing.

In this case, in the biometric authentication server 200, if the authentication of the NS authentication unit 222 fails (step S610: NO), the NS authentication result notifying unit 223 transmits the authentication result indicating that the authentication fails to the cache server 300 becoming the transmission origin of the authentication request (step S611).

For example, when the NS authentication unit 222 fails in authenticating the authentication request "C" from the client terminal "1", the NS authentication result notifying unit 223 receives the authentication result indicating that the authentication with respect to the fingerprint information "C" fails and information indicating that the transmission origins are the cache server "1" and the client terminal "1", from the NS authentication unit 222. The NS authentication result notifying unit 223 transmits the authentication result indicating that the authentication with respect to the fingerprint information "C" fails and the information indicating that the client terminal 400 becoming the transmission origin of the authentication request is the client terminal "1", to the client terminal "1".

Then, in the cache server 300, if the CS authentication result notifying unit 323 receives the authentication result transmitted by the NS authentication result notifying unit 223, the CS authentication result notifying unit 323 transmits the authentication result to the client terminal 400 (step S612). Specifically, the CS authentication result notifying unit 323 receives the authentication result and the information to identify the transmission origin of the authentication request and transmits the authentication result to the client terminal 400, using the information to identify the transmission origin of the authentication request. For example, the CS authentication result notifying unit 323 transmits the authentication result indicating that the authentication with respect to the fingerprint information "C" fails, to the client terminal "1".

As described in steps S606 and S607, the CS log data generating unit 325 generates the log and transmits the log to the biometric authentication server 200. Then, the NS log data reception processing unit 225 stores the log in the NS log storage unit 213. When the authentication executed by the cache server 300 fails, the result of the authentication executed by the biometric authentication server 200 is recorded in the log through the CS authentication result notifying unit 323.

Meanwhile, in the biometric authentication server 200, if the NS authentication unit 222 executes the authentication (step S610: YES), the NS authentication result notifying unit 223 transmits the authentication result indicating that the authentication succeeds, to the cache server 300 becoming the transmission origin of the authentication request (step S613). For example, if the NS authentication unit 222 authen-ticates the authentication request "B", the NS authentication result notifying unit 223 transmits the authentication result indicating that the authentication with respect to the fingerprint information "B" succeeds, to the cache server "1".

Then, in the cache server 300, if the CS authentication result notifying unit 323 receives the authentication result transmitted by the NS authentication result notifying unit 223, the CS authentication result notifying unit 323 transmits the authentication result to the client terminal 400 (step S614).

In the biometric authentication server 200, the NS setting unit 224 transmits the authentication information to the cache server 300 (step S615). For example, the NS setting unit 224 transmits the authentication information used when the fingerprint information "B" is authenticated and the management ID to identify the authentication information, to the cache server "1".

Then, in the cache server 300, if the CS cache managing unit 324 receives the authentication information, the CS cache managing unit 324 stores the authentication information in the CS cache 311 (step S616). For example, in the cache server "1", the CS cache managing unit 324 receives the authentication information used when the fingerprint information "C" is authenticated and the management ID and stores the authentication information and the management ID in the CS cache 311.

As described in steps S606 and S607, the CS log data generating unit 325 generates the log and transmits the log to the biometric authentication server 200. Then, the NS log data reception processing unit 225 stores the log in the NS log storage unit 213.

In this case, the difference of the authentication processing executed by the cache server 300 and the authentication processing executed by the biometric authentication server 200 is additionally described. In the authentication system according to the first embodiment, when the authentication processing is executed by the cache server 300, the CS authentication unit 322 executes the authentication processing using the authentication information stored in the CS cache 311 as the one-to-many population. The CS cache 311 stores the authentication information that is received from the biometric authentication server 200 and stores a part of the authentication information that is stored in the NS authentication information storage unit 211. The other points are the same as the authentication processing executed by the cache server 300 and the authentication processing executed by the biometric authentication server 200.

For example, the NS authentication information storage unit 211 stores "100 pieces" of authentication information and the CS cache 311 stores "10 pieces" of authentication information. In the authentication processing that is executed by the cache server 300, the authentication processing is executed using the "10 pieces" of authentication information stored in the CS cache 311 as the one-to-many population. Meanwhile, in the authentication processing that is executed by the biometric authentication server 200, the authentication processing is executed using the "100 pieces" of authentication information stored in the NS authentication information storage unit 211 as the one-to-many population.

Flow of Cache Server Determination (Selection) Processing

Figure 8:
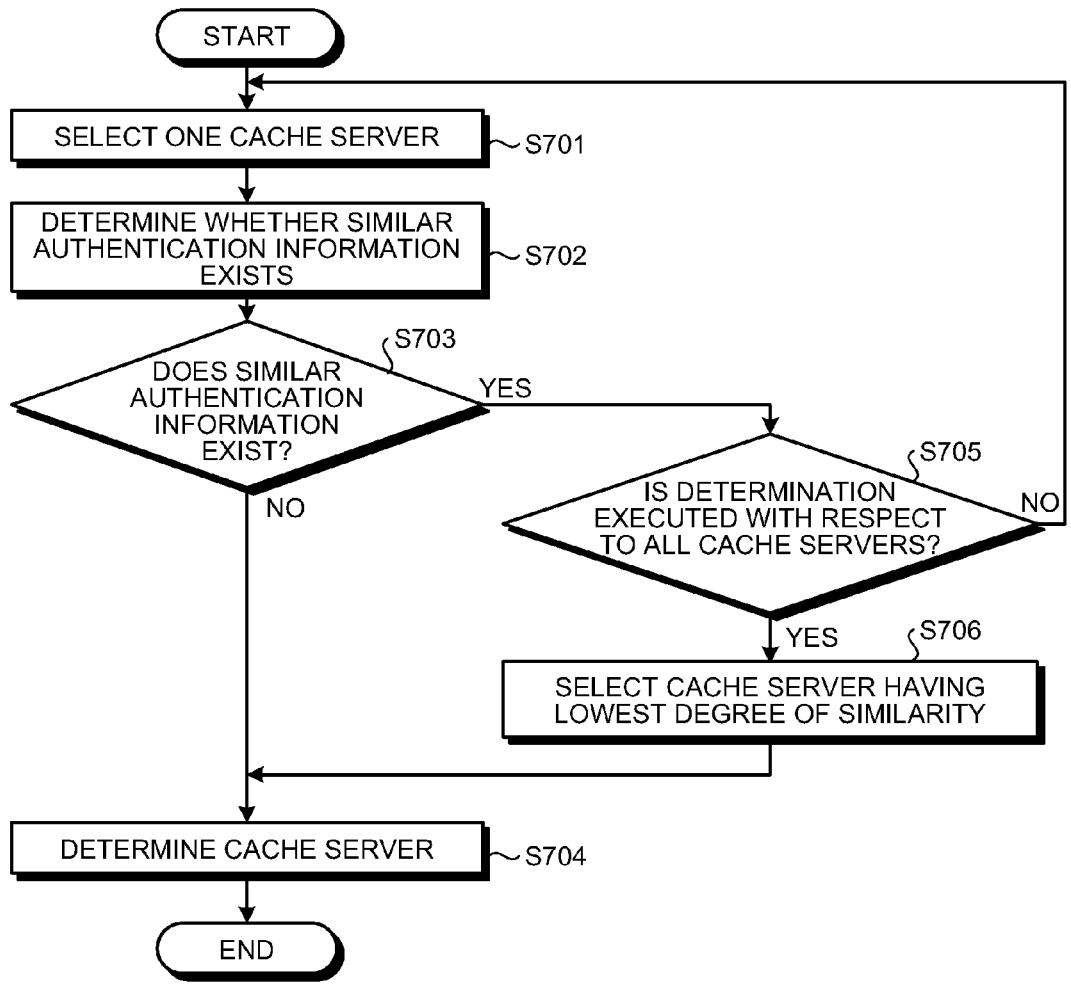
FIG. 8 is a flowchart illustrating an example of a flow of cache server determination processing in the authentication system according to the first embodiment.

The flow of the cache server determination processing in the authentication system according to the first embodiment will be described using FIG. 8. FIG. 8 is a flowchart illustrating an example of the flow of the cache server determination processing in the authentication system according to the first embodiment. The cache server determination processing to be described below corresponds to step S105 of FIG. 2 or step S507 of FIG. 6. In the description below, it is assumed that the biometric authentication server 200 receives the authentication request "A" and succeeds in authenticating the fingerprint information "A".

In the biometric authentication server 200, if the NS setting unit 224 receives the authentication request, the NS setting unit 224 verifies authentication information to authenticate the transmission origin of the authentication request using the authentication information stored by the CS cache 311 for each cache server 300, and selects a sub-authentication server where a degree of similarity calculated as a verification result becomes a predetermined threshold value or less.

That is, as illustrated in FIG. 8, in the biometric authentication server 200, the NS setting unit 224 selects one cache server 300 from the registered cache servers 300 (step S701). That is, the NS setting unit 224 selects one cache server 300 from the cache servers 300 where the mutual authentication is executed by the NS server authentication unit 221. Specifically, the NS setting unit 224 selects one identification information in the identification information that is stored in the NS identification information storage unit 212.

The NS setting unit 224 determines whether there is authentication information similar to the biometric information received by the authentication request, using the authentication stored by the CS cache 311 in the selected cache server 300 as the one-to-many population (step S702).

That is, in the biometric authentication server 200, the NS identification information storage unit 212 manages the authentication information transmitted to the cache server 300, for each cache server 300. For example, the NS identification information storage unit 212 stores a "management ID" with respect to the authentication information transmitted to the cache server 300, for each identification information. The NS setting unit 224 reads all of the management IDs that are associated with the identification information to identify the selected cache servers 300, from the NS identification information storage unit 212, and determines whether there is authentication information similar to the authentication information identified with the management ID. For example, the NS setting unit 224 determines whether there is identification information similar to the fingerprint information "A". When it is determined that there is authentication information similar to the fingerprint information, the NS setting unit 224 determines whether the CS cache 311 stores authentication information where a degree of matching is more than a threshold value.

In this case, when it is determined that there is no authentication information similar to the fingerprint information, (step S703: NO), the NS setting unit 224 determines the selected cache server 300 (step S704). That is, the NS setting unit 224 determines the selected cache server 300 as the cache server 300 that executes the authentication processing with respect to the authentication request transmitted hence from the client terminal 400.

Meanwhile, when it is determined that there is authentication information similar to the fingerprint information (step S703: YES), the NS setting unit 224 determines whether a determination on whether there is authentication information similar to the fingerprint information is executed with respect to all of the cache servers 300 (step S705). In this case, when it is determined that the determination is not executed (step S705: NO), the NS setting unit 224 returns to step S701 and repeats the processing.

Meanwhile, when it is determined that the determination is executed (step S705: YES), the NS setting unit 224 selects the cache server 300 where a degree of similarity is lowest (step S706). For example, when it is determined that all of the cache servers 300 store authentication information similar to the fingerprint information "A" in the CS cache 311, the NS setting unit 224 selects the cache server 300 where a degree of matching is lowest. The NS setting unit 224 determines the cache server 300 as the cache server 300 that executes the authentication processing with respect to the authentication request transmitted hence from the client terminal 400 (step S704).

The cache server 300 where a degree of matching is lowest corresponds to the cache server 300 that stores authentication information where a degree of matching is lowest, when all of the cache servers 300 stores similar authentication information one by one. When there is the cache server 300 that stores plural similar authentication information, the NS setting unit 224 may select the cache server 300 where a sum or an average of degrees of matching is smallest. For example, the NS setting unit 224 may select the cache servers 300 where the number of similar authentication information is smaller than those of the other cache servers 300 in preference to the cache servers 300 where the number of similar authentication information is larger than those of the other cache servers 300.

In this case, after an example of a reason why erroneous authentication where the verification result indicating that the authentication information is matched with authentication information of another person is obtained is generated described, a meaning of determining the cache server 300 using the degree of matching will be described.

The authentication processing determines whether the authentication succeeds or fails using the degree of matching. In this case, authentication information different from each other and authentication information similar to each other statistically exist. The biometric information is information that has the possibility of being changed according to a state of the user. For example, the fingerprint information "A" that is received from the user "A" does not become the same information every time and may become fingerprint information (for example, fingerprint information "A'") that partially includes distortion.

As a result, in the authentication processing, the error authentication where the verification result indicating that the authentication information is matched with authentication information of another person is obtained may be generated. For example, the case where the authentication information "A" and the authentication information "B" similar to each other exist will be described. In the case where the NS setting unit 224 executes the authentication processing with respect to the fingerprint information "A", the distortion is generated when the fingerprint information "A" is read. For this reason, a degree of matching with the authentication information "X" becomes higher than a degree of matching with the authentication information "A", and there may be generated the erroneous authentication where the verification result indicating that the fingerprint information is matched with the authentication information "X" is obtained.

That is, the meaning of the cache server determining method is to prevent authentication information similar to the one-to-many population from being included. When the authentication processing is executed by the cache server 300, the CS cache 311 does not store the authentication information similar to each other, and the authentication information that is similar to the one-to-many population used in the authentication processing can be prevented from being included. As a result, erroneous recognition can be prevented using the cache server determining method.

Configuration of the Authentication System According to First Embodiment

Figure 9:
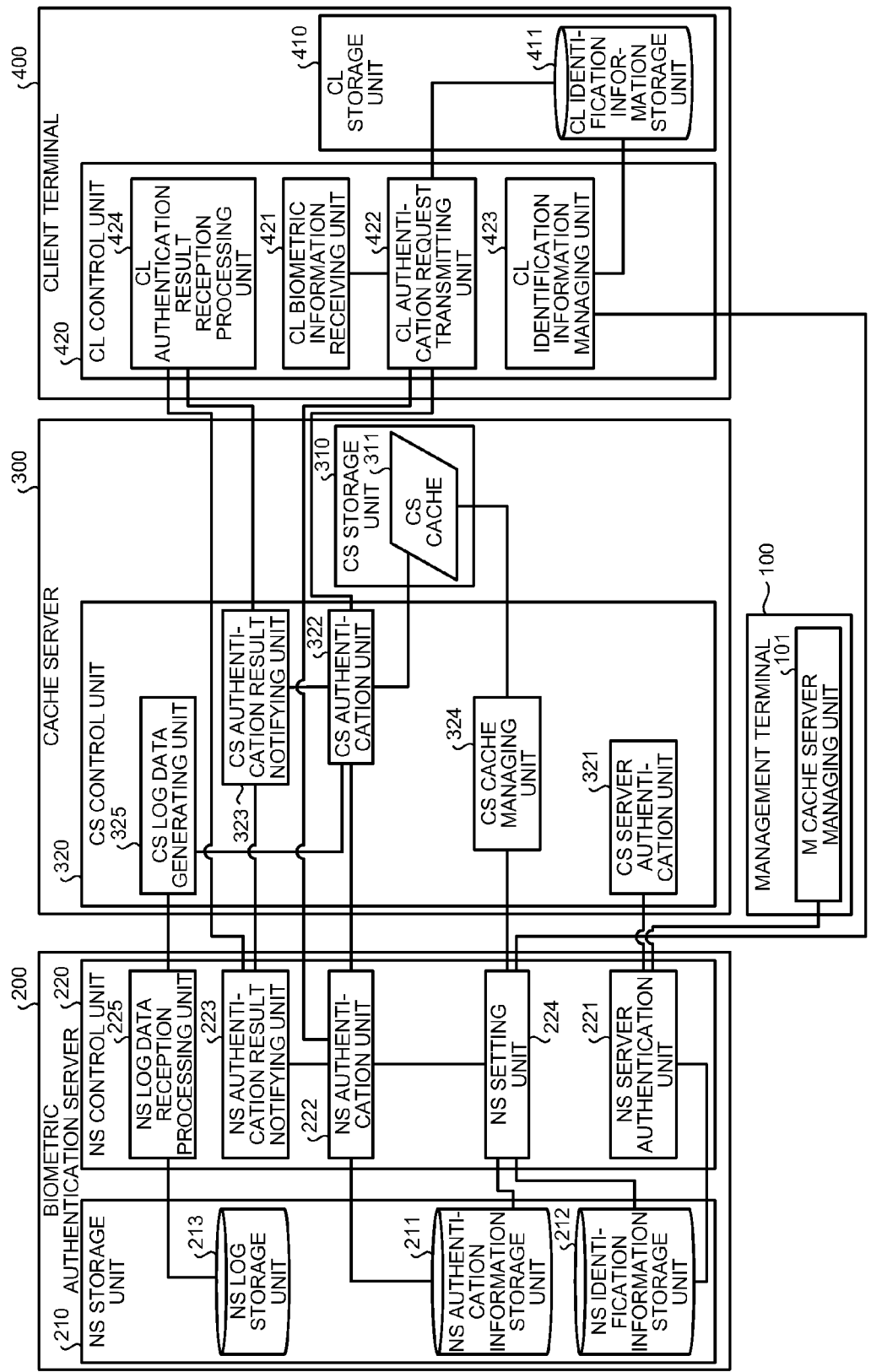
FIG. 9 is a block diagram illustrating an example of the configuration of the authentication system according to the first embodiment.

Next, an example of the configuration of the authentication system where the outline is described using FIG. 1 will be described using FIG. 9. FIG. 9 is a block diagram illustrating an example of the configuration of the authentication system according to the first embodiment. In the description below, the configuration of the management terminal 100, the configuration of the biometric authentication server 200, the configuration of the cache server 300, and the configuration of the client terminal 400 will be sequentially described.

Configuration of the Management Terminal

The management terminal 100 is used by the manager when the biometric authentication server 200 or the cache server 300 is controlled. As illustrated in FIG. 9, the management terminal 100 includes the M cache server managing unit 101.

The M cache server managing unit 101 is connected to the NS server authentication unit 221. The M cache server managing unit 101 receives the identification information to identify the cache server 300, from the manager, and transmits the identification information to the NS server authentication unit 221. For example, the M cache server managing unit 101 receives the identification information "1" from the manager and transmits the identification information "1" to the NS server authentication unit 221.

The management terminal 100 is a mobile communication terminal, such as a personal computer, a game machine for home, an Internet TV, a personal digital assistant (PDA), a mobile phone, or a personal handy phone system (PHS). The management terminal 100 can be realized by implementing the M cache server managing unit 101 in the well-known personal computer.

Configuration of the Biometric Authentication Server

The biometric authentication server 200 manages authentication information (also called user data) in an integrated fashion, receives an authentication request from the client terminal 400, and executes authentication processing. As illustrated in FIG. 9, the biometric authentication server 200 includes an NS storage unit 210 and an NS control unit 220. The management in an integrated fashion means that the biometric authentication server 200 stores all of the authentication information used in the authentication system according to the first embodiment in the NS authentication information storage unit 211.

The biometric authentication server 200 is not limited to the case where the biometric authentication server is realized by one device, and may be realized by plural devices using the clustering configuration.

The NS storage unit 210 stores data that is needed to execute the authentication processing, the enrollment processing, and the determination processing using the NS control unit 220. As illustrated in FIG. 9, the NS storage unit 210 includes the NS authentication information storage unit 211, the NS identification information storage unit 212, and the NS log storage unit 213.

The NS authentication information storage unit 211 is connected to the NS authentication unit 222 and the NS setting unit 224 and stores all of the authentication information that is used in the authentication system according to the first embodiment. For example, as illustrated in FIG. 10, the NS authentication information storage unit 211 associates the authentication information with the management IDs and stores the authentication information. FIG. 10 is a diagram illustrating an example of information that is stored by an NS authentication information storage unit in the first embodiment.

In the example illustrated in FIG. 10, the NS authentication information storage unit 211 associates authentication information "X7c6T2r4B3u2G4b1W6a0" with a management ID "10001" and stores the authentication information. In the example illustrated in FIG. 10, the NS authentication information storage unit 211 does not store a fingerprint image as the authentication information, and extracts a bifurcation point or a ridge ending point included in a ridge in the fingerprint image as a feature point and stores the feature point as a character string. For example, the authentication information "X7c6T2r4B3u2G4b1W6a0" indicates the feature point in the fingerprint image.

The authentication information is stored in the NS authentication information storage unit 211 by previously storing the authentication information by the manager and the authentication information that is stored in the NS authentication information storage unit 211 is used by the NS server authentication unit 221 or the NS setting unit 224.

As described above, the NS authentication information storage unit 211 stores the authentication information that is used when the fingerprint information "A" or the fingerprint information "B" is authenticated and stores the authentication information that is used when the fingerprint information "C" is authenticated.

The NS identification information storage unit 212 is connected to the NS server authentication unit 221 and the NS setting unit 224 and stores information on the cache server 300. Specifically, as illustrated in FIG. 11, the NS identification information storage unit 212 stores the identification information to identify the cache server 300, and stores the management ID with respect to the authentication information transmitted to the cache server 300, for each identification information. FIG. 11 is a diagram illustrating an example of information that is stored by the NS identification information storage unit in the first embodiment.

For example, as illustrated in FIG. 11, the NS identification information storage unit 212 stores the identification information, for example, identification information "192.168.0.1" or identification information "192.168.0.2". The NS identification information storage unit 212 stores the identification information "192.168.0.1" as the identification information corresponding to the identification information "1" and stores the identification information "192.168.0.2" as the identification information corresponding to the identification information "2".

For example, as illustrated in FIG. 11, the NS identification information storage unit 212 associates each management ID with each identification information and stores an association result. For example, the NS identification information storage unit 212 associates a management ID "10001", a management ID "10002", and a management ID "10003" with the identification information "192.168.0.2" and stores an association result. In the example illustrated in FIG. 11, the NS identification information storage unit 212 stores the identification information to identify the cache server "1" and stores that the authentication information identified with each of the management IDs "1001" to "1003" is transmitted to the cache server "1".

In the NS identification information storage unit 212, the identification information is stored by the NS server authentication unit 221 and the management ID is stored by the NS setting unit 224. The identification information and the management ID that are stored in the NS identification information storage unit 212 are used by the NS setting unit 224.

The NS log storage unit 213 is connected to the NS log data reception processing unit 225, and stores the log with respect to each of the cache server 300, as illustrated in FIG. 12. FIG.

12 is a diagram illustrating an example of information that is stored by the NS log storage unit in the first embodiment.

As illustrated in FIG. 12, the NS log storage unit 213 associates and stores identification information to identify the cache server 300 where the authentication processing is executed, a management ID to identify the authentication information used in the cache server 300, a "date and time", and an "authentication result" indicating a success or a failure of authentication, as the log. The "date and time" is a time when the log is generated. However, the "date and time" may be a time when the log is stored in the NS log storage unit 213 or a time when the authentication processing is executed by the cache server 300.

In the example illustrated in FIG. 12, the NS log storage unit 213 associates and stores the identification information "192.168.0.1", the management ID "1001", the date and time "2008/6/13 18:40", and the authentication result "success". That is, in the example illustrated in FIG. 12, the NS log storage unit 213 stores that a log indicating that the authentication processing identified by the management ID "10001" is executed by the cache server "1" identified by the identification information "192.168.0.1" and the authentication "succeeds" is generated at the date and time "2008/6/13 18:40".

In the NS log storage unit 213, the log is stored by the NS log data reception processing unit 225.

The NS control unit 220 has an internal memory that stores a program where authentication processing, registration processing, and determination processing are defined, and executes the authentication processing, the registration processing, and the determination processing. As illustrated in FIG. 9, the NS control unit 220 includes the NS server authentication unit 221, the NS authentication unit 222, the NS authentication result notifying unit 223, the NS setting unit 224, and the NS log data reception processing unit 225.

The NS server authentication unit 221 is connected to the NS identification information storage unit 212, the CS server authentication unit 321, and the M cache server managing unit 101 and executes mutual authentication. Specifically, the NS server authentication unit 221 receives the identification information from the M cache server managing unit 101 and executes the mutual authentication with the CS server authentication unit 321 in the cache server 300 identified by the identification information. For example, if the NS server authentication unit 221 receives the identification information "1", the NS server authentication unit 221 executes the mutual authentication with the CS server authentication unit 321 in the cache server "1".

The NS server authentication unit 221 stores the identification information to identify the cache server 300 that succeeds in the mutual authentication, in the NS identification information storage unit 212. For example, if the NS server authentication unit 221 succeeds in the mutual authentication with the cache server "1", the NS server authentication unit 221 stores the identification information "1" in the NS identification information storage unit 212.

The NS authentication unit 222 is connected to the NS authentication information storage unit 211, the NS authentication result notifying unit 223, the NS setting unit 224, the CS authentication unit 322, and the CL authentication request transmitting unit 422. If the NS authentication unit 222 receives the authentication request transmitted by the CS authentication unit 322 or the CL authentication request transmitting unit 422, the NS authentication unit 222 executes the authentication processing using the authentication information stored in the NS authentication information storage unit 211.

Specifically, the NS authentication unit 222 verifies each piece of authentication information stored in the NS authentication information storage unit 211 and the biometric information designated by the authentication request. The NS authentication unit 222 determines that the authentication succeeds, when there is authentication information where a degree of similarity that matched with the biometric information is more than a threshold value as a verification result. The NS authentication unit 222 determines that the authentication fails when there is no authentication information where a degree of similarity that matched with the biometric information is more than a threshold value as the verification result. For example, if the NS authentication unit 222 receives the authentication request "A", the NS authentication unit 222 executes the authentication processing with respect to the fingerprint information "A".

The NS authentication unit 222 transmits the authentication result to the NS authentication result notifying unit 223 and the NS setting unit 224. Specifically, the NS authentication unit 222 transmits the authentication result indicating that the authentication succeeds, when the authentication succeeds, and transmits the authentication result indicating that the authentication fails, when the authentication fails. The NS authentication unit 222 transmits the authentication result and the information to identify the transmission origin of the authentication request.

For example, when the NS authentication unit 222 receives the authentication request "A" from the CL authentication request transmitting unit 422 and succeeds in the authentication, the NS authentication unit 222 transmits the authentication result indicating that the authentication with respect to the fingerprint information "A" succeeds and the information indicating that the transmission origin is the client terminal "1". For example, when the NS authentication unit 222 receives the authentication request "C" from the client terminal "1" from the CS authentication unit 322 of the cache server "1" and fails in the authentication, the NS authentication unit 222 transmits the authentication result indicating that the authentication with respect to the fingerprint information "C" fails and the information indicating that the transmission origins are the client terminal "1" and the cache server "1".

The NS authentication result notifying unit 223 is connected to the NS authentication unit 222, the CS authentication result notifying unit 323, and the CL authentication result receiving unit 424, and transmits the result of the authentication executed by the NS authentication unit 222 to the CS authentication result notifying unit 323 or the CL authentication result receiving unit 424.

Specifically, the NS authentication result notifying unit 223 receives the authentication result and the information to identify the transmission origin of the authentication request, from the NS authentication unit 222, and transmits the authentication result to the transmission origin, using the information to identify the transmission origin of the authentication request. In this case, when NS authentication unit 222 receives the authentication request from the CL authentication request transmitting unit 422, the NS authentication result notifying unit 223 transmits the authentication result to the CL authentication result receiving unit 424. When the NS authentication unit 222 receives the authentication request from the CS authentication unit 322, the NS authentication result notifying unit 223 transmits the authentication result to the CS authentication result notifying unit 323.

The NS setting unit 224 (also called an "authentication information transmitting unit" or an "identification information transmitting unit") is connected to the NS authentication information storage unit 211, the NS identification information storage unit 212, the NS authentication unit 222, the CS cache managing unit 324, and the CL identification information managing unit 423.

The NS setting unit 224 receives the authentication result and the information to identify the transmission origin of the authentication request, from the NS authentication unit 222. For example, the NS setting unit 224 receives the authentication result indicating that the authentication with respect to the fingerprint information "A" succeeds and the information indicating that the transmission origin is the client terminal "1", from the NS authentication unit 222.

If the NS setting unit 224 receives the authentication result indicating that the authentication succeeds, from ht NS authentication unit 222, the NS setting unit determines the cache server 300, transmits the authentication information to the cache server 300, and transmits the identification information to the client terminal 400. For example, the NS setting unit 224 determines the cache server "1".

The NS setting unit determines the cache server 300 when the NS authentication unit 222 receives the authentication request from the client terminal 400 and does determine the cache server 300 when the NS authentication unit 222 receives the authentication request from the cache server 300. For example, when the NS setting unit 224 receives the information to identify the cache server 300 as the information to identify the transmission origin of the authentication request, from the NS authentication unit 222, the NS setting unit 224 does not determine the cache server 300. That is, this is because the cache server 300 does not need to be newly determined with respect to the client terminal 400 that previously transmits the authentication request to the cache server 300.

The case where the NS setting unit 224 determines the cache server 300 will be specifically described. When the NS setting unit 224 receives the authentication result indicating that the authentication succeeds and the information indicating that the transmission origin of the authentication request is the biometric authentication server 200, the NS setting unit 224 determines one cache server 300. That is, the NS setting unit 224 determines the cache server "1" as the cache server that executes the authentication processing with respect to the authentication request transmitted from the client terminal "1". Since the cache server determination processing using the NS setting unit 224 is described in detail using FIG. 8, the description is omitted herein.

The case where the NS setting unit 224 transmits the authentication information to the cache server 300 will be specifically. If the NS setting unit 224 receives the authentication result that the authentication succeeds, from the NS authentication unit 222, the NS setting unit 224 transmits the authentication information that is included in the authentication information stored in the NS authentication information storage unit 211 and is used when the authentication request received from the client terminal 400 is authenticated. In detail, the NS setting unit 224 receives the information to identify the transmission origin of the authentication request, from the NS authentication unit 222, and transmits the authentication information using the information to identify the transmission origin of the authentication request. The NS setting unit 224 transmits the authentication information and the management ID to identify the authentication information.

The case where the NS setting unit 224 transmits the identification information to the client terminal 400 will be specifically described. The NS setting unit 224 transmits the identification information to identify the determined cache server 300 to the client terminal 400. For example, the NS setting unit 224 transmits the identification information to identify the cache server "1" to the client terminal "1".

If the authentication information stored in the NS authentication information storage unit 211 is updated, for example, the authentication information is updated by the manager, the NS setting unit 224 transmits the updated authentication information to the cache server 300. Specifically, the NS setting unit 224 acquires the identification information associated with the management ID to identify the updated authentication information, from the NS identification information storage unit 212, and transmits the updated identification information to the cache server 300 identified by the identification information.

The NS log data reception processing unit 225 is connected to the NS log storage unit 213 and the CS log data generating unit 325, receives the log that is transmitted by the CS log data generating unit 325, and stores the log in the NS log storage unit 213.

The biometric authentication server 200 corresponds to a personal computer or a work station. The biometric authentication server 200 can be realized by implementing the NS authentication information storage unit 211, the NS identification information storage unit 212, and the NS log storage unit 213 in a well-known server. The biometric authentication server 200 can be realized by implementing the NS server authentication unit 221, the NS authentication unit 222, the NS authentication result notifying unit 223, the NS setting unit 224, and the NS log data reception processing unit 225 in a well-known server.

Configuration of the Cache Server

The cache server 300 is connected between the client terminal 400 to transmit the authentication request and the biometric authentication server 200, caches the authentication information needed for the authentication processing, and executes the authentication processing. As illustrated in FIG. 9, the cache server 300 includes a CS storage unit 310 and a CS control unit 320.

The CS storage unit 310 stores data needed to execute the authentication processing by the CS control unit 320, and includes a CS cache 311 as illustrated in FIG. 9.

The CS cache 311 is connected to the CS authentication unit 322 and the CS cache managing unit 324 and corresponds to a cache. As illustrated in FIG. 13, the CS cache 311 associates the authentication information with the management ID and stores the authentication information. FIG. 13 is a diagram illustrating an example of information that is stored by the CS cache in the first embodiment.

In the example illustrated in FIG. 13, the CS cache 311 stores the authentication information with respect to only the management ID "10001" to the management ID "10003", different from the NS authentication information storage unit 211 (refer to FIG. 11) that stores the authentication information with respect to the management ID "10001" to the management ID "10005".

The authentication information is stored in the CS cache 311 by the CS cache managing unit 324 and the authentication information that is stored in the CS cache 311 is used by the CS authentication unit 322.

The CS control unit 320 has an internal memory that stores a program where an authentication processing sequence is defined and executes the authentication processing. As illustrated in FIG. 9, the CS control unit 320 includes the CS server authentication unit 321, the CS authentication unit 322, the CS authentication result notifying unit 323, the CS cache managing unit 324, and the CS log data generating unit 325.

The CS server authentication unit 321 is connected to the NS server authentication unit 221 and executes mutual authentication with the NS server authentication unit 221.

The CS authentication unit 322 is connected to the CS cache 311, the CS authentication result notifying unit 323, the CS log data generating unit 325, the NS authentication unit 222, and the CL authentication request transmitting unit 422. Specifically, if the CS authentication unit 322 receives the authentication request transmitted by the CL authentication request transmitting unit 422, the CS authentication unit 322 executes the authentication processing using the authentication information stored in the CS cache 311. For example, when the CS authentication unit 322 receives the authentication request "A", the CS authentication unit 322 executes the authentication processing with respect to the fingerprint information "A".

When the CS authentication unit 322 succeeds in the authentication, the CS authentication unit 322 transmits the authentication result indicating that the authentication succeeds and the information to identify the transmission origin of the authentication request, to the CS authentication result notifying unit 323 and the CS log data generating unit 325.

For example, the case where the CS authentication unit 322 receives the authentication request "A" from the CL authentication request transmitting unit 422 of the client terminal "1" and succeeds in authenticating the fingerprint information "A" will be described. The CS authentication unit 322 transmits the authentication result indicating that the authentication with respect to the fingerprint information "A" succeeds and the information indicating that the transmission origin is the client terminal "1", to the CS authentication result notifying unit 323. The CS authentication unit 322 transmits the authentication result indicating that the authentication with respect to the fingerprint information "A" succeeds, to the CS log data generating unit 325.

When the CS authentication unit 322 fails in authenticating the fingerprint information, the CS authentication unit 322 transmits that is received from the CL authentication request transmitting unit 422, to the NS authentication unit 222. For example, if the CS authentication unit 322 fails in authenticating the fingerprint information "B", the CS authentication unit 322 transmits the authentication request "B" to the NS authentication unit 222.

The CS authentication result notifying unit 323 is connected to the CS authentication unit 322, the NS authentication result notifying unit 223, and the CL authentication result receiving unit 424. If the CS authentication result notifying unit 323 receives the authentication result from the CS authentication unit 322 or the NS authentication result notifying unit 223, the CS authentication result notifying unit 323 transmits the authentication result to the client terminal 400.

The case where the CS authentication result notifying unit 323 receives the authentication result from the CS authentication unit 322 will be described. The CS authentication result notifying unit 323 receives the authentication result indicating that the authentication succeeds and the information to identify the transmission origin of the authentication request, from the CS authentication unit 322, and transmits the authentication result using the information to identify the transmission origin of the authentication request. For example, the case where the CS authentication result notifying unit 323 receives the authentication result indicating that the authentication with respect to the fingerprint information "A" succeeds and the information indicating that the transmission origin is the client terminal "1" will be described. The CS authentication result notifying unit 323 transmits the authentication result indicating that the authentication with respect to the fingerprint information "A" succeeds, to the CL authentication result receiving unit 424 of the client terminal "1".

The case where the CS authentication result notifying unit 323 receives the authentication result from the NS authentication result notifying unit 223 will be described. For example, the case where the CS authentication result notifying unit 323 receives the authentication result indicating that the authentication with respect to the fingerprint information "B" succeeds and the information indicating that the transmission origin is the client terminal "1" will be described. The CS authentication result notifying unit 323 transmits the authentication result indicating that the authentication with respect to the fingerprint information "B" succeeds, to the CL authentication result receiving unit 424 of the client terminal "1".

The CS cache managing unit 324 is connected to the CS cache 311 and the NS setting unit 224, receives the authentication information transmitted by the NS setting unit 224, and stores the authentication information in the CS cache 311. For example, the CS cache 311 receives the management ID and the authentication information from the NS setting unit 224 and stores the management ID and the authentication information in the CS cache 311. The CS cache managing unit 324 receives the updated authentication information from the NS setting unit 224 and updates the authentication information stored in the CS cache 311 using the received authentication information.

The CS log data generating unit 325 is connected to the CS authentication unit 322 and the NS log data reception processing unit 225. If the CS log data generating unit 325 receives the authentication result from the CS authentication unit 322, the CS log data generating unit 325 generates a log with respect to the authentication processing on the authentication result, and transmits the log to the NS log data reception processing unit 225, whenever the log is generated. For example, the CS log data generating unit 325 associates and transmits the identification information to identify the cache server 300 where the authentication processing is executed, a management ID to identify the authentication information used in the cache server 300, and a "date and time", as the log.

For example, the log that is transmitted when the CS log data generating unit 325 receives the authentication result indicating that the authentication with respect to the fingerprint "A" succeeds, from the CS authentication unit 322, will be described. The CS log data generating unit 325 transmits the identification information to identify the cache server 300 as the identification information. The CS log data generating unit 325 transmits the management ID "10001" that is used when the fingerprint information "A" is authenticated, as the management ID. The CS log data generating unit 325 transmits a date and time when the log is generated, as the "date and time".

The cache server 300 corresponds to a personal computer or a work station. The cache server 300 can be realized by implementing the CS cache 311, the CS server authentication unit 321, the CS authentication unit 322, the CS authentication result notifying unit 323, the CS cache managing unit 324, and the CS log data generating unit 325 in a well-known server.

The cache server 300 may be realized as a dedicated application. In the cache server 300, the processing capacity is small and use places of a storage unit such as a disk device are restricted, different from the biometric authentication server 200. Therefore, the cache server 300 may be realized as the dedicated application. The dedicated application exchanges information with the biometric authentication server 200, the client terminal 400, and the management terminal 100, using a dedicated communication port provided on a computer to execute the dedicated application.

Configuration of the Client Terminal

The client terminal 400 receives the biometric information from the user and transmits an authentication request, and includes a CL storage unit 410 and a CL control unit 420 as illustrated in FIG. 9.

The CL storage unit 410 stores data that is needed for authentication request transmission processing using the CL control unit 420, and includes a CL identification information storage unit 411 as illustrated in FIG. 9.

The CL identification information storage unit 411 is connected to the CL authentication request transmitting unit 422 and the LC identification information managing unit 423. As illustrated in FIG. 14, the CL identification information storage unit 411 stores identification information to identify the transmission destination of the authentication request. FIG. 14 is a diagram illustrating an example of information that is stored by the CL identification information storage unit in the first embodiment.

Specifically, the CL identification information storage unit 411 previously stores the identification information to identify the biometric authentication server 200 and stores the identification information that is updated by the CL identification information managing unit 423 and is used to identify the cache server 300. In the example illustrated in FIG. 14, the CL identification information managing unit 423 associates and stores identification information and a "last update date and time" that indicates a date and time when the identification information is finally updated by the CL identification information managing unit 423. For example, the CL identification information storage unit 411 associates identification information "192.168.0.1" and a last update date and time "2008/5/20 10:00" and stores the association result.

The identification information is stored in the CL identification information storage unit 411 by the CL identification information managing unit 423 and the identification information that is stored in the CL identification information storage unit 411 is used by the CL authentication request transmitting unit 422.

The CL control unit 420 has an internal memory that stores a program where an authentication request transmission processing sequence is defined, and executes authentication request transmission processing. As illustrated in FIG. 9, the CL control unit 420 includes the CL biometric information receiving unit 421, the CL authentication request transmitting unit 422, the CL identification information managing unit 423, and the CL authentication result reception processing unit 424.

The CL biometric information receiving unit 421 is connected to the CL authentication request transmitting unit 422 and corresponds to a biometric information detector, such as a fingerprint sensor. The CL biometric information receiving unit 421 receives the biometric information from the user and transmits the received biometric information to the CL authentication request transmitting unit 422. For example, the CL biometric information receiving unit 421 receives the fingerprint information "A" from the user "A" and transmits the received fingerprint information "A" to the CL authentication request transmitting unit 422.

The CL authentication request transmitting unit 422 is connected to the CL identification information storage unit 411, the CL biometric information receiving unit 421, the NS authentication unit 222, and the CS authentication unit 322. If the CL authentication request transmitting unit 422 receives the biometric information from the CL biometric information receiving unit 421, the CL authentication request transmitting unit 422 transmits an authentication request using the identification information stored in the CL identification information storage unit 411.

For example, the CL authentication request transmitting unit 422 transmits the authentication request to the biometric authentication server 200, using the identification information to identify the biometric authentication server 200 previously stored in the CL identification information storage unit 411. For example, the CL authentication request transmitting unit 422 transmits the authentication request to the cache server 300, using the identification information to identify the cache server 300 that is updated by the CL identification information managing unit 423 and is stored in the CL identification information storage unit 411.

The CL identification information managing unit 423 is connected to the CL identification information storage unit 411 and the NS setting unit 224. If the CL identification information managing unit 423 receives identification information from the NS setting unit 224, the CL identification information managing unit 423 updates the identification information that is stored in the CL identification information storage unit 411, using the identification information. For example, the CL identification information managing unit 423 updates the identification that is stored in the CL identification information storage unit 411, from the identification information to identify the biometric authentication server 200 to the identification information "1".

The CL authentication result reception processing unit 424 is connected to the NS authentication result notifying unit 223 and the CS authentication result notifying unit 323 and receives the authentication result from the NS authentication result notifying unit 223 or the CS authentication result notifying unit 323.

The client terminal 400 is a mobile communication terminal, such as a personal computer, a game machine for home, an Internet TV, a PDA, a mobile phone, or a PHS. The client terminal 400 can be realized by implementing the CL identification information storage unit 411, the CL biometric information receiving unit 421, the CL authentication request transmitting unit 422, the CL identification information managing unit 423, and the CL authentication result reception processing unit 424 in the well-known personal computer.

In the first embodiment described above, the case where the biometric authentication server 200 transmits the identification information to the client terminal 400 is described, but the present invention is not limited thereto. For example, the cache server 300 may transmit the identification information to the client terminal 400. For example, in the cache server 300, the CS cache 311 may receive the authentication information and the identification information from the NS setting unit 224 and transmit the identification information to the CL identification information managing unit 423.

Effect of First Embodiment

As described above, according to the first embodiment, if the biometric authentication server 200 receives the authentication request, the biometric authentication server 200 transmits the authentication information that is used when the transmission origin of the authentication request is authenticated, to the cache server 300. The biometric authentication server 200 or the cache server 300 transmits the identification information to which the authentication information is transmitted, to the client terminal 400 that transmits the authentication request. The client terminal 400 includes the CL identification information managing unit 423 that stores the identification information to identify the transmission destination of the authentication, and transmits the authentication request to the transmission destination that is identified with the identification information stored by the CL identification information managing unit 423. If the client terminal 400 receives the identification information transmitted to the biometric authentication server 200 or the cache server 300, the client terminal 400 updates the identification information that is stored in the CL identification information managing unit 423, using the received identification information. The cache server 300 stores the authentication information that is transmitted to the sub-authentication server by the biometric authentication server 200. If the cache server 300 receives the authentication request, the cache server 300 authenticates the transmission origin of the authentication request, using the stored authentication information. As a result, the load of the setting processing can be alleviated while the processing capability of the authentication system can be enhanced.

Specifically, since the authentication processing is executed by the cache server 300 as well as the biometric authentication server 200, the processing capability of the authentication system can be enhanced. In this authentication system, the biometric authentication server 200 transmits the authentication information that is used by the cache server 300, to the cache server 300, and transmits the transmission destination information to the client terminal 400. The user or the manager does not execute the setting processing and the cache server 300 can execute the authentication processing. As a result, in this authentication system, the load of the setting processing can be alleviated.

As described above, as the cache server 300, a cache server that does not include a storage unit to store a log not needed for the authentication processing and includes only the CS cache 311 as the storage device, and can have the configuration simpler than the configuration of the biometric authentication server 200 can be used. As a result, the cache server 300 can be realized using a device cheaper than a device having the same configuration as the biometric authentication server 200.

As described above, in the authentication system according to the first embodiment, the functions of the biometric authentication server 200 are partially separated to be operated as the cache server 300. The cache server 300 caches the authentication information that is needed for the authentication processing and uses the authentication information, and can realize the high-speed authentication and the high-speed response. That is, the authentication processing can be executed at a high speed.

As described above, in the authentication system according to the first embodiment, the authentication information that is stored in the CS cache 311 becomes a part of the authentication information that is stored in the NS authentication information storage unit 211. As a result, in the cache server 300, the one-to-many population can become smaller as compared with the biometric authentication server 200, and the authentication processing can be executed at a high speed as compared with the authentication processing in the biometric authentication server 200. By scattering the cache server 300 in an operation environment, the processing load with respect to the biometric authentication server 200 can be reduced, and the processing load with respect to the biometric authentication server 200 can be dispersed.

As described above, the authentication processing is repeated in the authentication system according to the first embodiment, the authentication information is accumulated in the cache server 300, and the authentication system receives the authentication requests from the various client terminals 400 and authenticates the authentication requests. As a result, the entire performance of the authentication system can be improved.

[b] Second Embodiment

As the first embodiment, the method in which the biometric authentication server 200 stores the log from the cache server 300 in the NS log storage unit 213 is described. In this invention, the log may be stored in the NS log storage unit 213 and the load of the authentication processing with respect to the cache server 300 may be equalized using the log.

That is, the cache servers 300 where the authentication frequency is higher than those of the other cache servers 300 or the cache servers 300 where the authentication frequency is lower than those of the other cache servers 300 are determined using the log stored in the NS log storage unit 213. The cache servers 300 where the frequency is higher may be controlled such that the frequency becomes lower and the cache servers 300 where the frequency is lower may be controlled such that the frequency becomes higher.

The cache servers 300 where the authentication frequency is higher than those of the other cache servers 300 are the cache servers 300 where the load of the authentication processing is high, and are called the high-load cache servers 300 hereinafter. The cache servers 300 where the authentication frequency is lower than those of the other cache servers 300 are the cache servers 300 where the load of the authentication processing is low, and are called the low-load cache servers 300 hereinafter.

Therefore, as the second embodiment, a method that equalizes the load of the authentication processing with respect to the cache server 300 using the log will be hereinafter described. Hereinafter, the description of the same configuration as the authentication system according to the first embodiment will not be repeated.

Configuration of an Authentication System According to Second Embodiment

Figure 15:
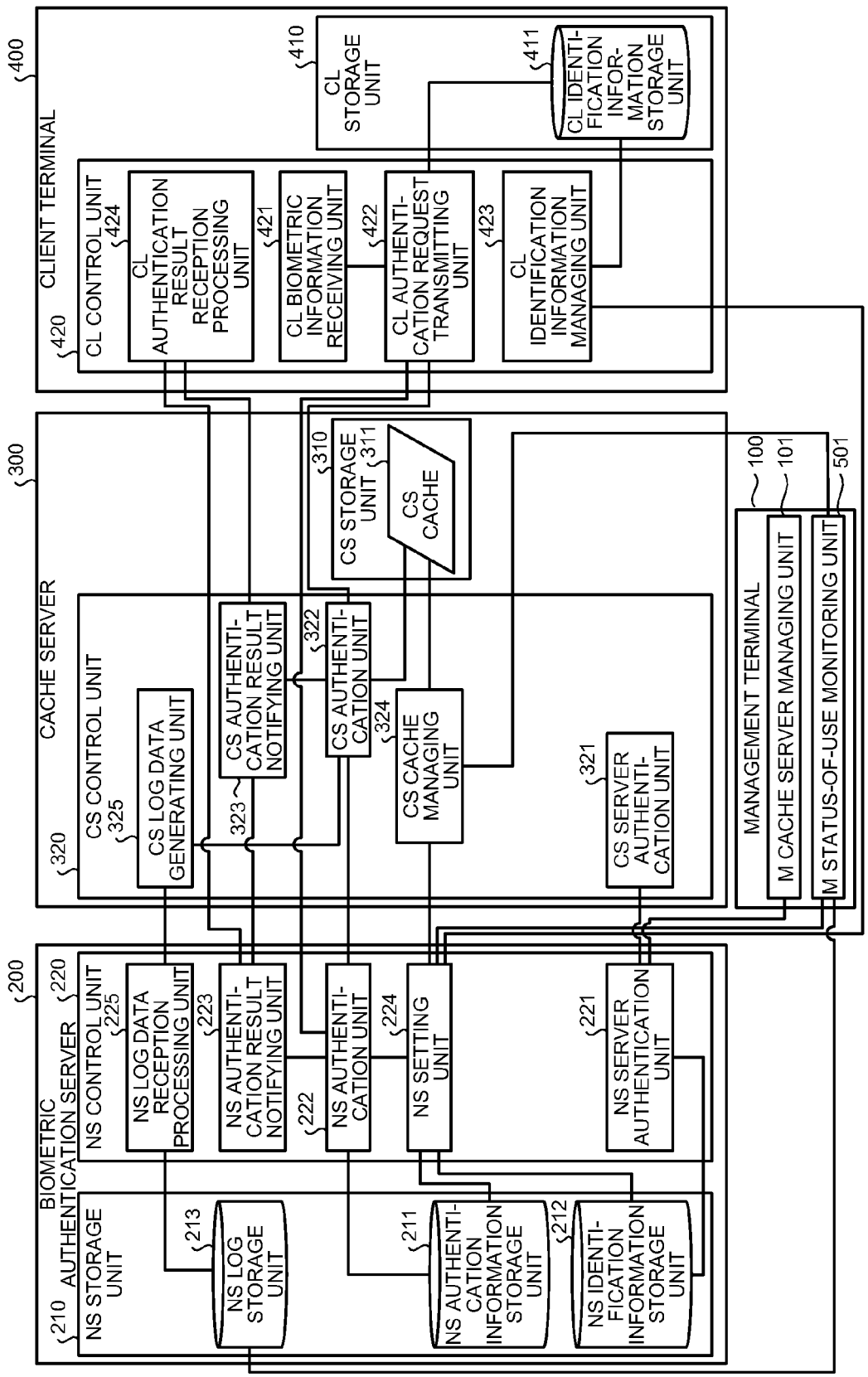
FIG. 15 is a block diagram illustrating an example of the configuration of an authentication system according to a second embodiment.

First, the configuration of the authentication system according to the second embodiment will be described using FIG. 15. FIG. 15 is a block diagram illustrating an example of the configuration of the authentication system according to the second embodiment. As illustrated in FIG. 15, in the authentication system according to the second embodiment, the management terminal 100 further includes an M status-of-use monitoring unit 501, in addition to the configuration of the authentication system according to the first embodiment.

Figure 16:
FIG. 16 is a diagram illustrating an example of information that is stored by an NS log storage unit in the second embodiment.

In the authentication system according to the second embodiment, in order to simplify the description, as illustrated in (2) of FIG. 16, the NS log storage unit 213 associates a management ID, the use frequency, and a last use date and time for each identification information to identify the cache server 300 and stores an association result, as a log. FIG. 16 is a diagram illustrating an example of information that is stored by the NS log storage unit in the second embodiment.

In this case, the management ID illustrated in FIG. 16 is a management ID with respect to authentication information that is transmitted to the cache server 300 identified by the corresponding identification information. The use frequency indicates the use frequency of the authentication information that is identified by the management ID. For example, the use frequency indicates the number of times of authentication that is executed using the authentication information. The last use date and time indicates a date and time when the authentication information identified by the corresponding management ID is finally used.

For example, as illustrated in (1) of FIG. 16, the NS log data reception processing unit 225 calculates the "use frequency" and the "last use date and time" from the log where the identification information, the management ID, and the date and time are associated with each other. As illustrated in (2) of FIG. 16, the NS log data reception processing unit 225 stores the log in the NS log storage unit 213. A specific example is described. The NS log data reception processing unit 225 calculates the number of logs for each combination of the identification information and the management ID and sets the number of logs as the "use frequency". The NS log data reception processing unit 225 sets the most recent "date and time" as the "last use date and time", for each combination of the identification information and the management ID.

Returning to the description of FIG. 15, in the authentication system according to the second embodiment, the M status-of-use monitoring unit 501 is connected to the NS log storage unit 213, the CS cache managing unit 324, and the NS setting unit 224. The M status-of-use monitoring unit 501 determines the high-load cache server 300 and the low-load cache server 300, using the log stored in the NS log storage unit 213. For example, the M cache server managing unit 101 regularly monitors and checks the log and starts the determination.

The M status-of-use monitoring unit 501 deletes a part of the authentication information that is stored by the CS cache 311, with respect to the high-load cache server 300. The M status-of-use monitoring unit 501 stores the authentication information that is deleted from the high-load cache server 300, in the CS cache 311, with respect to the low-load cache server 300. That is, the M status-of-use monitoring unit 501 deletes a part of the authentication information from the CS cache 311 of the high-load cache server 300 and stores the deleted authentication information in the CS cache 311 of the low-load cache server 300.

The M cache server managing unit 101 transmits information with respect to the deletion or the storage of the authentication information performed with respect to the CS cache 311 of the high-load cache server 300 or the low-load cache server 300, to the NS setting unit 224. For example, the M cache server managing unit 101 transmits the identification information to identify the high-load cache server 300 and the management ID with respect to the deleted authentication information. The M cache server managing unit 101 transmits the identification information to identify the low-load cache server 300 and the management ID with respect to the stored authentication information.

Then, the NS setting unit 224 updates the NS identification information storage unit 212, on the basis of the information received from the M cache server managing unit 101.

If the NS authentication unit 222 receives the authentication request authenticated by the authentication information deleted by the M cache server managing unit 101, the NS setting unit 224 transmits the identification information to identify the low-load cache server 300, to the client terminal 400 that becomes the transmission origin of the authentication request.

Here, the case where the NS authentication unit 222 receives the authentication request authenticated by the authentication information deleted by the M cache server managing unit 101 will be described using a specific example. As the specific example, the case where the client terminal "1" transmits the authentication request "A" to the cache server "1" and the cache server "1" stores the authentication information to store the fingerprint information "A" is used. Then, the case where the M cache server managing unit 101 deletes the authentication information to authenticate the fingerprint "A", from the cache server "1", and stores the authentication information in the cache server "2" is used.

In this case, the client terminal "1" transmits the authentication request "A" to the cache server "1". However, the cache server 300 deletes the authentication information to authenticate the fingerprint information "A" by the M cache server managing unit 101. When the authentication fails, the cache server 300 transmits the authentication request "A" to the biometric authentication server 200. In this case, the NS setting unit 224 receives the identification information of the cache server that becomes the storage destination of the authentication information to authenticate the fingerprint information "A", from the M cache server managing unit 101. For this reason, the NS setting unit 224 transmits the identification information "2" to the client terminal "1". Then, the client terminal "2" transmits the authentication request to the cache server "2".

In the second embodiment described above, the case where the part of the authentication information is deleted from the high-load cache server and the deleted authentication information is stored in the low-load cache server is described, but the present invention is not limited thereto. Specifically, the authentication information may be changed between the high-load cache server and the low-load cache server.

That is, the NS log storage unit 213 stores a log about the frequency of executing the authentication processing using the authentication information, for each piece of authentication information transmitted by the cache server 300, with respect to each cache server 300. The M cache server managing unit 101 uses the corresponding log, determines the authentication information having the high use frequency in the authentication information in the high-load cache server, and determines the authentication information having the low use frequency in the authentication information in the low-load cache server.

The M cache server managing unit 101 moves the authentication information having the high use frequency in the authentication information in the high-load cache server to the low-load cache server. The M cache server managing unit 101 moves the authentication information having the low use frequency in the authentication information in the low-load cache server to the low-load cache server.

As a result, the load of each cache server can be equalized without changing the number of authentication information in each cache server 300.

In the second embodiment described above, the case where the NS setting unit 224 of the biometric authentication server 200 transmits the identification information to identify the low-load cache server 300 at timing when the authentication request is received is described, but the present invention is not limited thereto. For example, the NS setting unit 224 may transmit the identification information to identify the low-load cache server 300 at arbitrary timing.

In the second embodiment described above, the case where the M cache server managing unit 101 deletes or stores the authentication information of the high-load cache server 300 or the low-load cache server 300 is described. However, the present invention is not limited thereto, and the function of the M cache server managing unit 101 may be realized by implementing a component having the same function as the M cache server managing unit 101 in the biometric authentication server 200 or the cache server 300.

Flow of Authentication Information Change Processing

Figure 17:
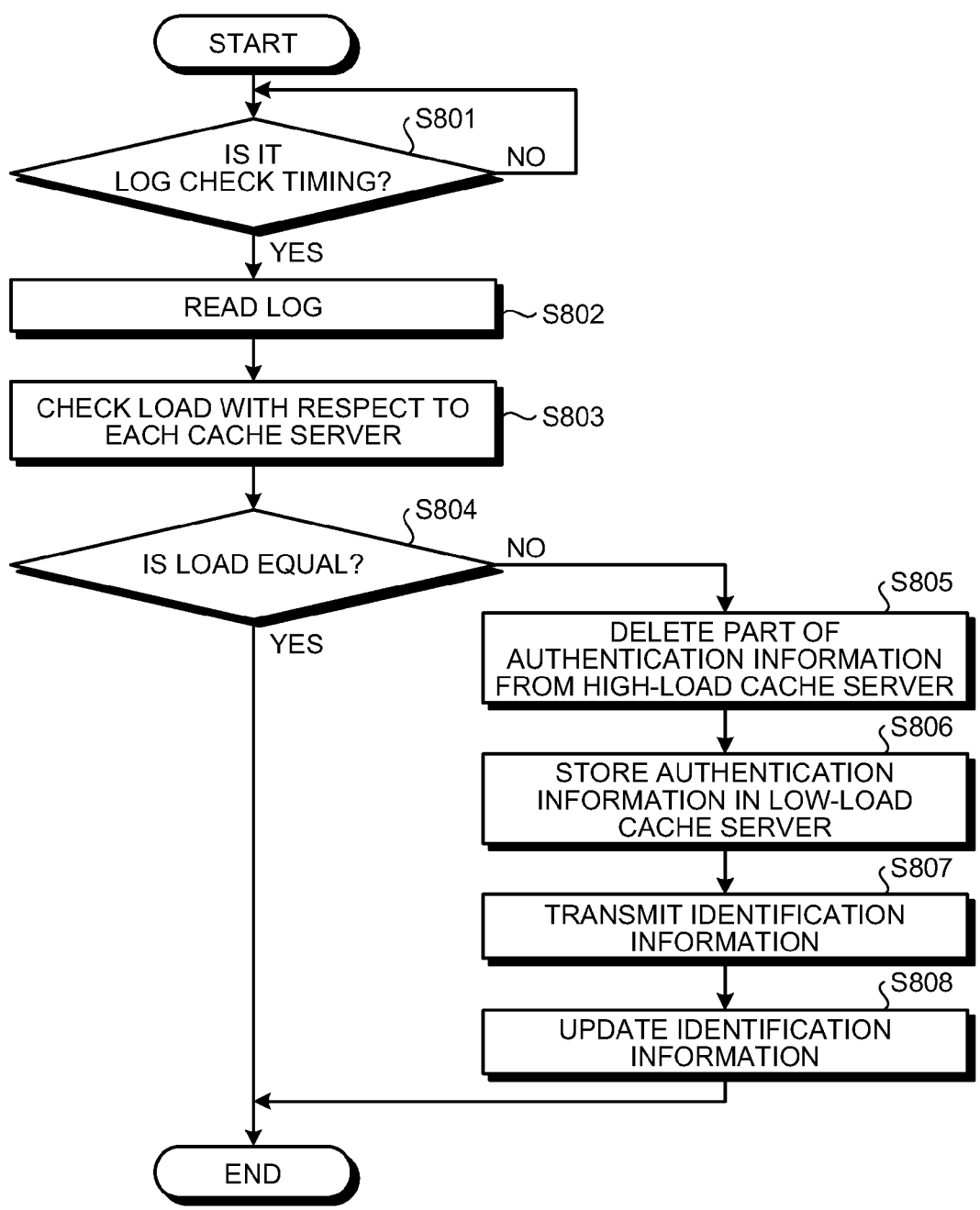
FIG. 17 is a flowchart illustrating an example of a flow of authentication information change processing in the authentication system in the second embodiment.

Next, an example of the flow of the authentication information change processing in the authentication system according to the second embodiment will be described using FIG. 17. FIG. 17 is a flowchart illustrating an example of the flow of the authentication information change processing in the authentication system in the second embodiment.

As illustrated in FIG. 17, in the authentication system according to the second embodiment, if current timing becomes log check timing (step S801: YES), the M cache server managing unit 101 reads the log from the NS log storage unit 213 (step S802). The M cache server managing unit 101 checks the load of the authentication processing with respect to each cache server 300 (step S803). That is, the M cache server managing unit 101 checks the frequency of the authentication processing that is executed by the CS authentication unit 322 of each cache server 300.

When the load is equal (step S804: YES), the M cache server managing unit 101 ends processing. Meanwhile, when the load is not equal (step S804: NO), the M cache server managing unit 101 deletes a part of the authentication information from the CS cache 311 of the high-load cache server 300 (step S805). The M cache server managing unit 101 stores the deleted authentication information in the CS cache 311 of the low-load cache server 300 (step S806).

Then, the NS setting unit 224 of the biometric authentication server 200 transmits the identification information (step S807). That is, the NS setting unit transmits the identification information to identify the cache server 300 that becomes the storage destination where the authentication information is stored, to the transmission origin authenticated using the authentication information deleted by the M cache server managing unit 101.

Then, in the client terminal 400, the CL identification information managing unit 423 updates the identification information stored in the CL identification information managing unit 423, using the received identification information (step S808).

Effect of Second Embodiment

As described above, according to the first embodiment, if the biometric authentication server 200 or the management terminal 100 deletes the part of the authentication information in the CS cache 311. The biometric authentication server 200 or the management terminal 100 stores the deleted authentication information in the CS cache 311, with respect to the low-load cache server 300. The biometric authentication server 200 or the management terminal 100 transmits the identification information to identify the cache server 300 that becomes the storage destination where the authentication information is stored, to the transmission origin authenticated using the deleted authentication information. If the client terminal 400 receives the identification information, the client terminal 400 updates the identification information stored in the CL identification information storage unit 411, using the received identification information. As a result, the load of the authentication processing with respect to each cache server 300 can be equalized. That is, in the entire authentication system, use of the cache server 300 to be balanced is enabled.

[c] Third Embodiment

As the first and second embodiments, the case where the biometric authentication server 200 includes only the CS cache 311 as the CS storage unit 310 is described. However, the present invention is not limited thereto, and may include a storage medium such as a disk device, in addition to the CS cache 311.

That is, the authentication information that is stored in the CS cache 311 may be backed up in a disk device and authentication information that is not stored in the CS cache 311 may be stored in the disk device. Therefore, as the third embodiment, a method using the disk device will be described hereinafter.

Configuration of an Authentication System According to Third Embodiment

Figure 18:
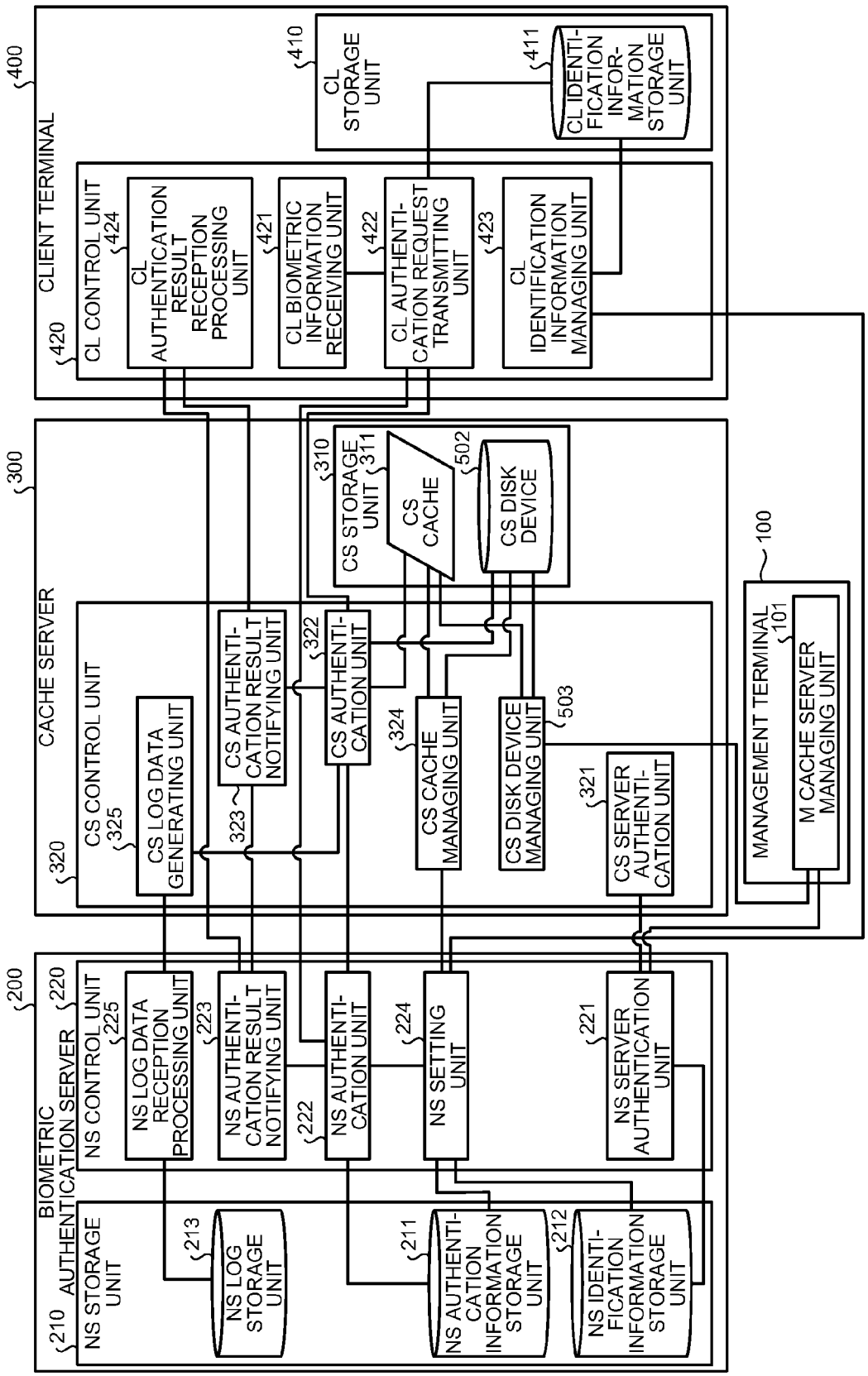
FIG. 18 is a block diagram illustrating an example of the configuration of an authentication system according to a third embodiment.

First, the configuration of the authentication system according to the third embodiment will be described using FIG. 18 is a block diagram illustrating an example of the configuration of the authentication system according to a third embodiment. As illustrated in FIG. 18, in the authentication system according to the third embodiment, the cache server 300 further includes a CS disk device 502 and a CS disk device managing unit 503, in addition to the configuration of the authentication system according to the first embodiment.

The CS disk device 502 according to the third embodiment is connected to the CS authentication unit 322, the CS cache managing unit 324, and the CS disk device managing unit 503. The CS disk device 502 corresponds to a disk device such as a magnetic disk (hard disk drive (HDD)) or a storage device such as a flash memory drive (solid state drive (SSD)). The CS disk device 502 stores backup data of authentication information that is stored in the CS cache 311 and stores authentication information that cannot be stored in the CS cache 311 due to capacity shortage.

In the CS backup storage unit 502, the backup data is stored by the CS disk device managing unit 503 and the authentication information is stored by the CS cache managing unit 324. The authentication information that is stored in the CS disk device 502 is used by the CS authentication unit 322 and the backup data that is stored in the CS disk device 502 is used by the CS disk device managing unit 503.

The CS disk device managing unit 503 in the third embodiment is connected to the CS cache 311 and the CS disk device 502. The CS disk device managing unit 503 backs up the authentication information that is stored in the CS cache 311, in the CS disk device 502. Since an example of backup processing that is executed by the CS disk device managing unit 503 is described below, the description is omitted herein.

The CS disk device managing unit 503 restores the authentication that is stored in the CS cache 311, using the backup data of the CS disk device 502. For example, when the CS disk device managing unit 503 does not read the authentication information stored in the CS cache 311 or receives a restoration instruction from the manager, the CS disk device managing unit 503 executes the restoration processing. When the CS disk device managing unit 503 receives the restoration instruction from the manager, the CS disk device managing unit 503 receives the restoration instruction input by the manager from the M cache server managing unit 101.

The CS cache managing unit 324 in the third embodiment stores the authentication information in the CS cache 311 or the CS disk device 502. Since an example of authentication information storage processing executed by the CS cache managing unit 324 is described below, the description is omitted herein.

The authentication unit 322 in the third embodiment executes the authentication using the authentication information stored in the CS cache 311 or the CS disk device 502.

When the CS cache 311 is full, the CS disk device managing unit 503 may record the use frequency and a last use date and time for each identification information stored in the CS cache 311, search authentication information where the use frequency is highest or authentication information where the last use date and time is oldest, and preferentially moves the searched authentication information to the CS disk device 502.

The CS disk device managing unit 503 in the third embodiment may change the authentication information that is stored in the CS disk device 502 and the authentication information that is stored in the CS cache 311. That is, when the authentication information exists on the CS disk device 502, the CS disk device managing unit 503 may regularly perform the search using the use frequency or the last use date and time and exchange the authentication information on the CS disk device 502 and the authentication information on the CS cache 311.

For example, the CS disk device managing unit 503 moves the authentication information which is included in the authentication information stored in the CS cache 311 and of which the use frequency is lower than the use frequency of the authentication information stored in the CS disk device 502, from the CS cache 311 to the CS disk device 502. The CS disk device managing unit 503 moves the authentication information which is included in the authentication information stored in the CS disk device 502 and of which the use frequency is higher than the use frequency of the authentication information stored in the CS cache 311, from the CS disk device 502 to the CS cache 311.

Processing Executed in the Authentication System According to Third Embodiment

Next, the processing that is executed in the authentication system according to the third embodiment will be described using FIGS. 19 and 20. After authentication information backup processing in the cache server is described, a flow of authentication information storage processing in the cache server will be described.

Backup Processing

An example of a flow of the authentication information backup processing in the cache server in the third embodiment will be described using FIG. 19. FIG. 19 is a flowchart illustrating an example of the flow of the authentication information backup processing in the cache server in the third embodiment.

Figure 19:
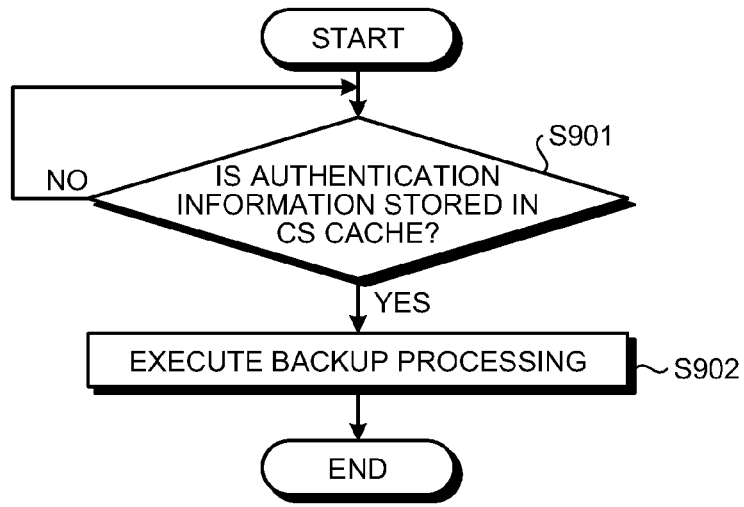
FIG. 19 is a flowchart illustrating an example of a flow of authentication information backup processing in a cache server in the third embodiment.

As illustrated in FIG. 19, if the authentication information is stored in the CS cache 311 (step S901: YES), the CS disk device managing unit 503 in the third embodiment executes the backup processing (step S902). That is, if the CS cache managing unit 324 stores the authentication information in the CS cache 311, the CS disk device managing unit 503 backs up the authentication information that is stored in the CS cache 311, in the CS disk device 502.

Authentication Information Storage Processing

An example of a flow of the authentication information storage processing in the cache server in the third embodiment will be described using FIG. 20. FIG. 20 is a flowchart illustrating an example of the flow of the authentication information storage processing in the cache server in the third embodiment.

Figure 20:
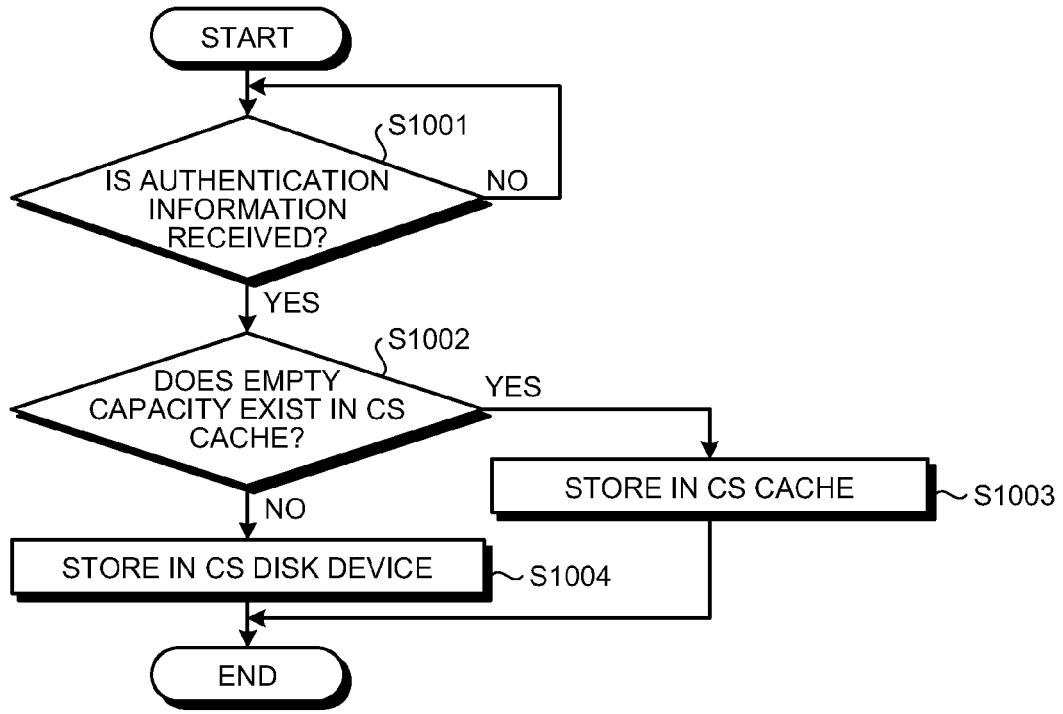
FIG. 20 is a flowchart illustrating an example of a flow of authentication information storage processing in the cache server in the third embodiment.

As illustrated in FIG. 20, if the CS cache managing unit 324 in the third embodiment receives the authentication information (step S1001: YES), the CS cache managing unit 324 determines whether the empty capacity exists in the CS cache 311 (step S1002). In this case, if it is determined that the empty capacity exists (step S1002: YES), the CS cache managing unit 324 stores the authentication information in the CS cache 311 (step S1003). Meanwhile, if it is determined that the empty capacity does not exist (step S1002: NO), the CS cache managing unit 324 stores the authentication information in the CS disk device 502 (step S1004).

Effect of Third Embodiment

As described above, according to the third embodiment, the cache server 300 backs up the authentication information that is stored in the CS cache 311, in the CS disk device 502. As a result, even when the cache server 300 is temporarily stopped due to plan maintenance and an obstacle and the authentication information stored in the CS cache 311 is erased, the authentication information that is stored before the stop can be restored and a state before the stop can be restored.

According to the third embodiment, when the empty capacity does not exist in the CS cache 311, the CS disk device 502 stores the authentication information that is stored by the biometric authentication server 200, and the CS authentication unit 322 executes the authentication using the authentication information stored in the CS disk device 502. As a result, the authentication information can be stored without depending on the upper limit of the capacity of the CS cache 311.

[d] Fourth Embodiment

The NS authentication unit 222 or the CS authentication unit 322 includes an internal authentication program storage unit that stores an authentication program used for authentication, and executes authentication processing using the authentication program stored in the authentication program storage unit. In this case, in the authentication system according to the fourth embodiment, when an authentication program with respect to any one of the biometric authentication server 200 and the cache server 300 is updated, a control operation may be performed such that the authentication program used by other authentication program is automatically updated. That is, a control operation may be performed such that the biometric authentication server 200 or the cache server 300 executes the authentication processing using an authentication program of a newest version. Therefore, in the fourth embodiment, a method that uses the authentication program of the newest version as the authentication program will be described.

In the description below, it is assumed that the authentication program used in the NS authentication unit 222 is the authentication program of the newest version.

Configuration of the Authentication System According to Fourth Embodiment

Figure 21:
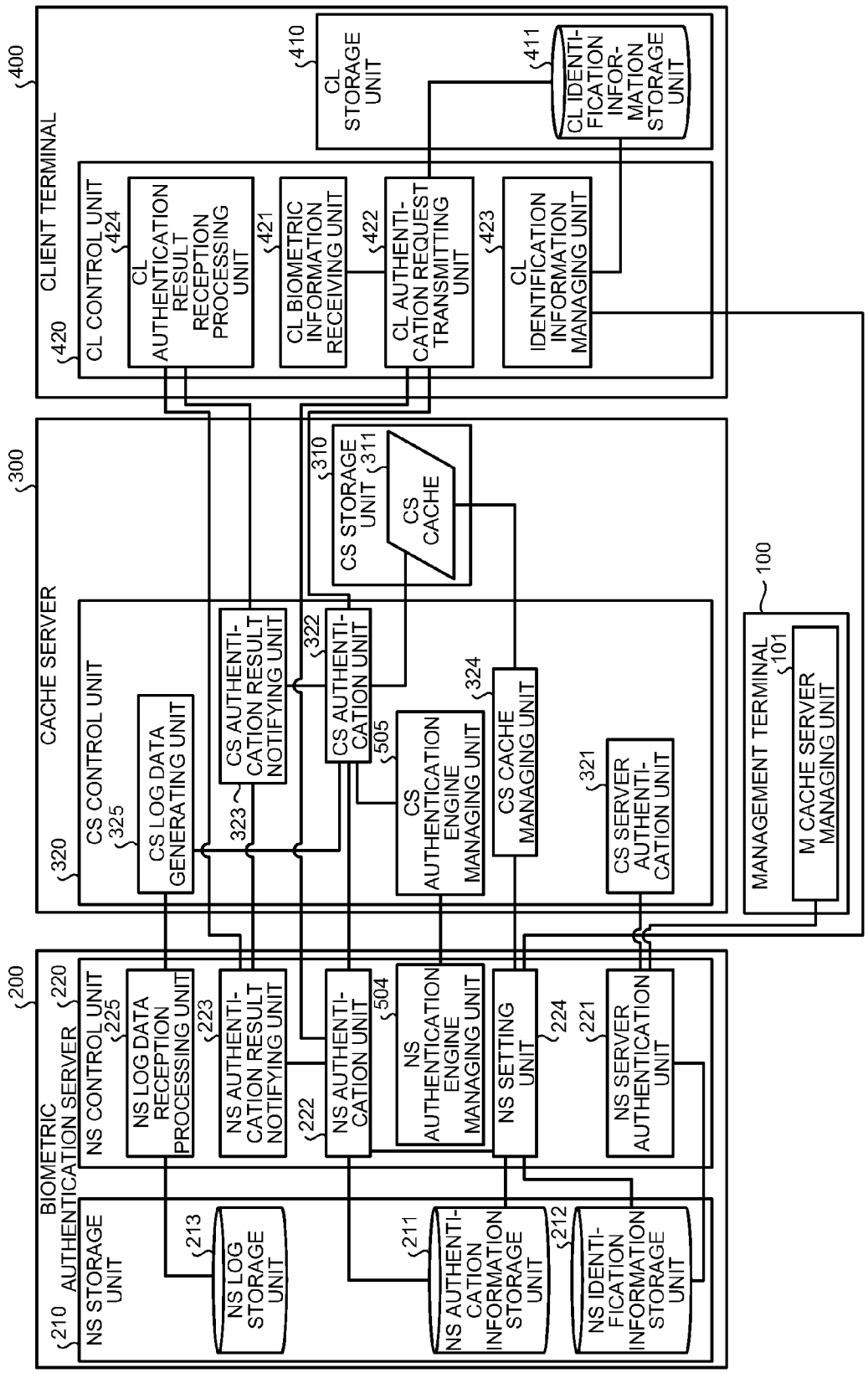
FIG. 21 is a block diagram illustrating an example of the configuration of an authentication system according to a fourth embodiment.

First, the configuration of the authentication system according to the fourth embodiment will be described using FIG. 21. FIG. 21 is a block diagram illustrating an example of the configuration of the authentication system according to the fourth embodiment. As illustrated in FIG. 21, in the authentication system according to the fourth embodiment, the biometric authentication server 200 further includes an NS authentication engine managing unit 504 and the cache server 300 further includes a CS authentication engine managing unit 505, in addition to the configuration of the authentication system according to the first embodiment.

The NS authentication engine managing unit 504 in the fourth embodiment is connected to the NS authentication unit 222 and the CS authentication engine managing unit 505, and manages the version of the authentication program that is used in the authentication system according to the fourth embodiment, together with the CS authentication engine managing unit 505.

Specifically, the NS authentication engine managing unit 504 confirms the version of the authentication program that is used in the NS authentication unit 222. The NS authentication engine managing unit 504 transmits a version confirmation request to confirm the version of the authentication program, to the CS authentication engine managing unit 505, and receives the version of the authentication program that is used in the CS authentication unit 322, from the CS authentication engine managing unit 505. The NS authentication engine managing unit 504 determines whether the version of the authentication program is matched. In this case, when the version of the authentication program is not matched, the NS authentication engine managing unit 504 transmits the authentication program that is used in the NS authentication unit 222, to the CS authentication engine managing unit 505.

For example, the NS authentication engine managing unit 504 executes management processing of the version of the authentication program, whenever the authentication processing is executed by the NS authentication unit 222 or the version of the authentication program used in the NS authentication unit 222 is updated.

The CS authentication engine managing unit 505 is connected to the CS authentication unit 322 and the NS authentication engine managing unit 504, and manages the version of the authentication program that is used in the authentication system according to the fourth embodiment, together with the NS authentication engine managing unit 504. Specifically, the CS authentication engine managing unit 505 receives the version confirmation request from the NS authentication engine managing unit 504. The CS authentication engine managing unit 505 confirms the version of the authentication program that is used in the CS authentication unit 322, and transmits the authentication program to the NS authentication engine managing unit 504.

If the CS authentication engine managing unit 505 receivers the authentication program from the NS authentication engine managing unit 504, the CS authentication engine managing unit 505 updates the authentication program that is sued in the CS authentication unit 322, using the corresponding authentication program.

Authentication Program Update Processing

Figure 22:
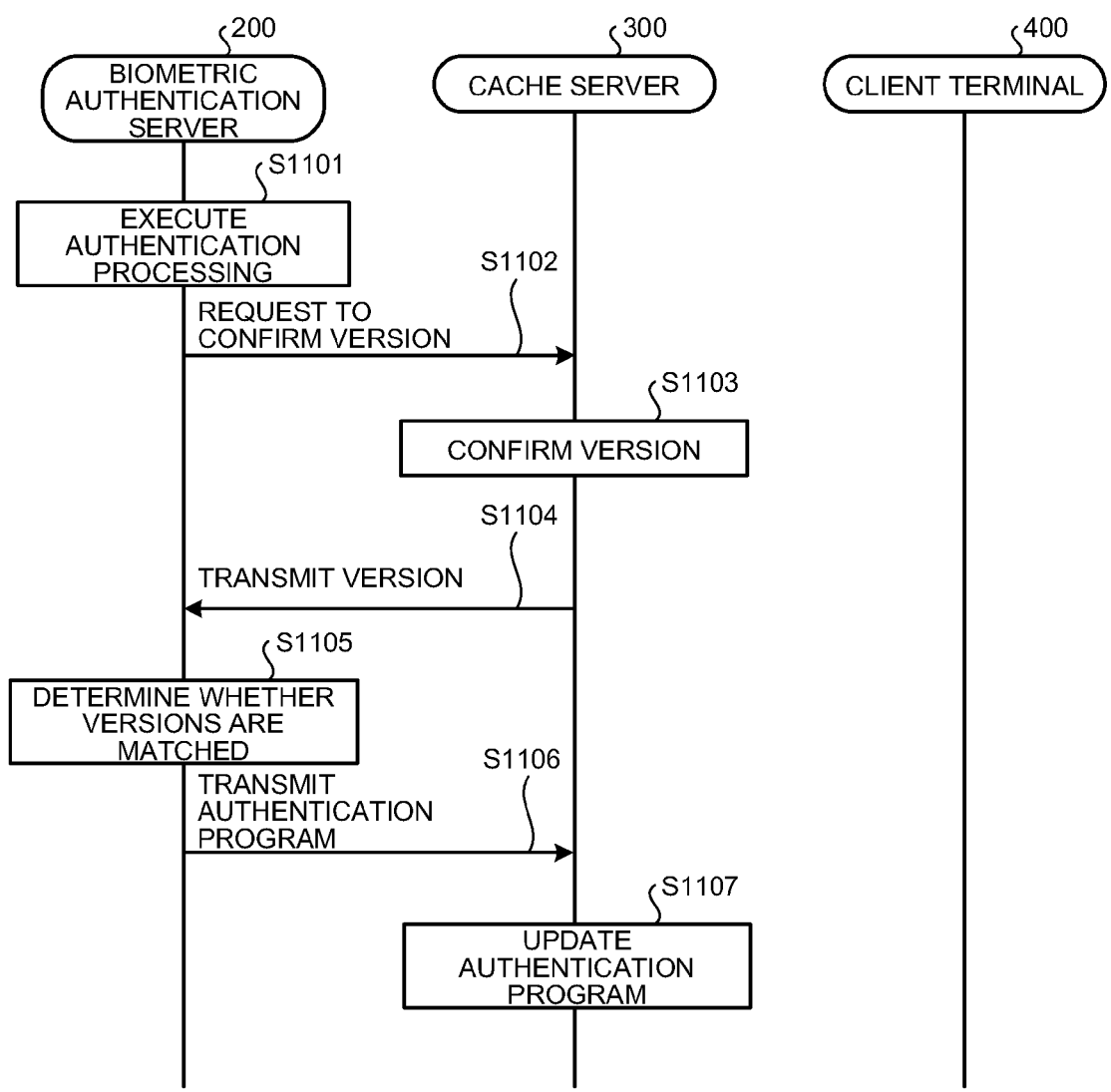
FIG. 22 is a flowchart illustrating an example of a flow of authentication program update processing in the authentication system according to the fourth embodiment.

Next, an example of a flow of the authentication program update processing in the authentication system according to the fourth embodiment will be described using FIG. 22. FIG. 22 is a flowchart illustrating an example of the flow of the authentication program update processing in the authentication system according to the fourth embodiment. The case where the version of the authentication program is not matched will be described using FIG. 22.

As illustrated in FIG. 22, in the biometric authentication server 200 in the fourth embodiment, if the authentication processing is executed by the NS authentication unit 222 (step S1101), the NS authentication engine managing unit 504 transmits a version confirmation request (step S1102).

Then, in the cache server 300 in the fourth embodiment, the CS authentication engine managing unit 505 confirms the version of the authentication program (step S1103). The CS authentication engine managing unit 505 transmits the version of the authentication program (step S1104).

Then, in the biometric authentication server 200 in the fourth embodiment, the NS authentication engine managing unit 504 determines whether the version is matched (step S1105). That is, the NS authentication engine managing unit 504 determines whether the version of the authentication engine used in the NS authentication unit 222 and the version received from the CS authentication engine managing unit 505 are matched with each other. When the versions are not matched, the NS authentication engine managing unit 504 transmits the authentication program that is used in the NS authentication unit 222, to the CS authentication engine managing unit 505 (step S1106). That is, when the version of the authentication program used in the CS authentication unit 322 is not the newest version, the NS authentication engine managing unit 504 transmits an authentication program of which a version becomes the newest version.

Then, in the cache server 300 in the fourth embodiment, the CS authentication engine managing unit 505 updates the authentication program that is sued by the CS authentication unit 322, using the received authentication program (step S1107). That is, the CS authentication engine managing unit 505 controls the CS authentication unit 322 to use the same authentication program as the NS authentication unit 222.

In the configuration or the processing of the authentication system according to the fourth embodiment, the NS authentication engine managing unit 504 determines the version of the authentication program, and the authentication program that is used in the NS authentication unit 222 is transmitted, but the present invention is not limited thereto. For example, the CS authentication engine managing unit 505 may determine the version of the authentication program and request the NS authentication engine managing unit 504 to receive the authentication program used in the CS authentication unit 322.

Effect of Fourth Embodiment

As described above, according to the fourth embodiment, each of the biometric authentication server 200 and the cache server 300 includes an authentication program storage unit that stores an authentication program. If the authentication program stored in the authentication program storage unit of the biometric authentication server 200 is updated, the biometric authentication server 200 transmits the updated authentication program to the sub-authentication server. If the cache server 300 receives the authentication program, the cache server 300 updates the authentication program that is stored in the authentication program storage unit. As a result, the biometric authentication server 200 and the cache server 300 can execute the authentication processing using the same authentication program. For example, a situation where the authentication program used by the biometric authentication server 200 is updated and the authentication program used by the cache server 300 is not updated can be prevented from being generated. That is, the version of the authentication program (software associated with an authentication engine) can be automatically managed.

Further, software compatibility of the authentication program that is used by the biometric authentication server 200 and the cache server 300 can be secured, and the authentication results of the biometric authentication server 200 and the cache server 300 can be prevented from becoming different. That is, the authentication results of the biometric authentication server 200 and the cache server 300 can be prevented from becoming different due to the different versions of the authentication programs.

[e] Fifth Embodiment

The embodiments of the present invention are described above. However, the present invention may be embodied in other embodiments, in addition to the embodiments described above. Therefore, other embodiments are described hereinafter.

NS authentication information storage unit or CS cache

For example, in the first embodiment, as illustrated in FIG. 10 or 13, the case where the NS authentication information storage unit 211 or the CS cache 311 associates the authentication information with the management ID and stores the association result is described, but the present invention is not limited thereto. As illustrated in FIG. 23, the NS authentication information storage unit 211 or the CS cache 311 may associate a "user ID", a "password", and a "valid period" in addition to the authentication information and the management ID and may store the association result. FIG. 23 is a diagram illustrating an example of information that is stored in the NS authentication information storage unit or the CS cache in the fifth embodiment.

In the NS authentication information storage unit 211, the password, the user ID, and the valid period are previously stored by the manager. With respect to the valid period, a predetermined period may be stored as a valid period, whenever the CS cache managing unit 324 stores the authentication information in the CS cache 311. When the valid period is set from an initial step where the cache server 300 is introduced, the NS setting unit 224 may set the valid period when the NS setting unit 224 transmits the authentication information to the cache server 300.

In the example illustrated in FIG. 23, the NS authentication information storage unit 211 or the CS cache 311 associates authentication information "X7c6T2r4B3u2G4b1W6a0" with a management ID "10001" and stores the association result, and stores a user ID "test001", a password "0o318c4n5p4o3p6q", and a valid period "2008/6/20 10:00".

In this case, the "user ID" is information to identify a user authenticated by the corresponding information. The "password" is information that is used by the NS authentication unit 222 or the CS authentication unit 322, when the authentication processing is executed. For example, the "password" is used together with the biometric information or is used, instead of the biometric information. If the user inputs the password, instead of the biometric information, the NS authentication unit 222 or the CS authentication unit 322 executes the authentication processing using the password.

The "valid period" indicates a valid period of the corresponding authentication information and is used by the CS cache managing unit 324. Specifically, in the cache server 300, the CS cache managing unit 324 deletes the authentication information where the valid period expires, from the CS cache 311. As a result, the CS cache 311 can be effectively used by using the "valid period". Specifically, the authentication information where the valid period expires can be automatically deleted and only the authentication information where the valid period does not expire can be stored in the CS cache 311.

As a result, the cache server 300 can be efficiently used even when the user exists in a fluid environment. The fluid environment corresponds to an environment where the user frequently executes the authentication processing using the different client terminals 400. That is, in the fluid environment, the possibility of the authentication information transmitted from the biometric authentication server 200 being used thereafter becomes low, as compared with an environment where the user uses the same client terminal 400.

Deletion of Authentication Information

For example, if a current state becomes a state where the empty capacity of the CS cache 311 needs to be increased, a part of the authentication information may be automatically deleted.

Specifically, when the CS cache managing unit 324 determines that the current state becomes the state where the empty capacity of the CS cache 311 needs to be increased, the CS cache managing unit 324 deletes a part of the authentication information that is stored in the CS cache 311. The state where the empty capacity needs to be increased corresponds to the case where the empty capacity is less than a predetermined threshold value or the case where the empty capacity does not exist.

As a result, the empty capacity of the CS cache 311 can be avoided from being insufficient. For example, if the empty capacity decreases, the CS cache 311 can be automatically maintained by deleting the authentication information having the low use frequency and deleting the authentication information registered in the plural cache servers 300.

CL Identification Information Storage Unit

For example, in the first embodiment, the case where the CL identification information storage unit 411 previously stores the identification information to identify the biometric authentication server 200, updates the identification information, and stores the identification information to identify the cache server 300 is described. That is, the case where the CL identification information storage unit 411 does not store the identification information to identify the biometric authentication server 200, when the CL identification information storage unit stores the identification information to cache server 300, is described. However, the present invention is not limited thereto, and the identification information to identify the biometric authentication server 200 may be stored, separately from the identification information to identify the cache server 300.

Specifically, as illustrated in FIG. 24, the CL identification information storage unit 411 stores the identification information to identify the biometric authentication server 300, separately from the identification information transmitted by the NS setting unit 224. In the example illustrated in FIG. 24, the CL identification information storage unit 411 stores "identification information (for update)" that is identification information to be updated by the CL identification information managing unit 423 and "identification information (biometric authentication server)" that is identification information to identify the biometric authentication server 200 to be previously stored. FIG. 24 is a diagram illustrating an example of information that is stored in the CL identification information storage unit in the fifth embodiment.

As a result, even when the authentication request is not transmitted to the cache server 300, the client terminal 400 can transmit the authentication request to the biometric authentication server 200, using the identification information to identify the biometric authentication server 300. The case where the authentication request is not limited to the cache server 300 corresponds to a situation where the cache server 300 is stopped or the cache server 300 is removed by the manager.

Encoding of Information to be Stored

Figure 25:
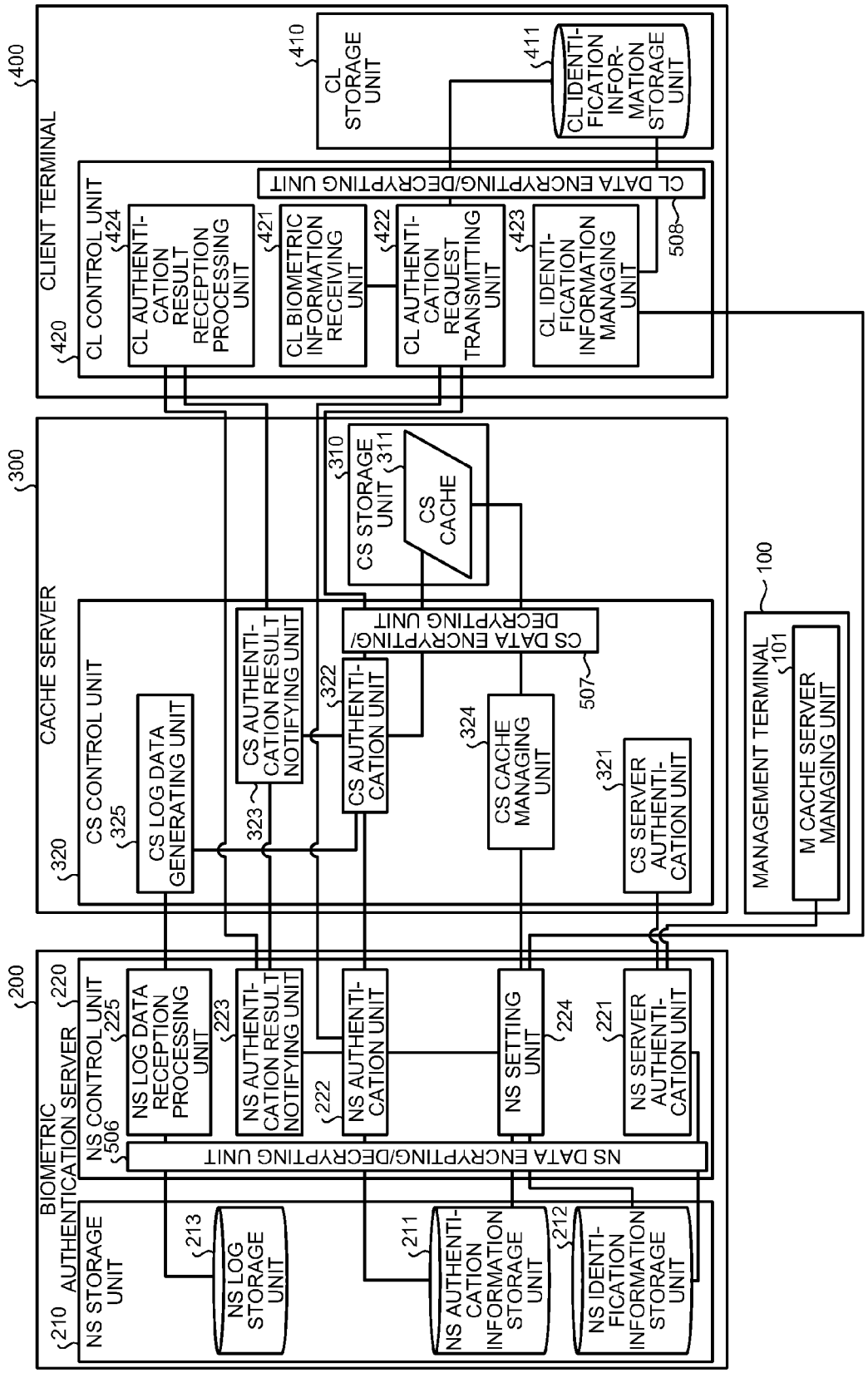
FIG. 25 is a block diagram illustrating an example of the configuration of an authentication system that stores information in an encrypted state in the fifth embodiment.

For example, as illustrated in FIG. 25, the biometric authentication server 200, the cache server 300, and the client terminal 400 may store information in their storage units in an encrypted state. FIG. 25 is a block diagram illustrating an example of the configuration of the authentication system that stores information in an encrypted state in the fifth embodiment.

As illustrated in FIG. 25, the biometric authentication server 200 further includes an NS data encrypting/decrypting unit 506, and the NS data encrypting/decrypting unit 506 is connected to each unit in the NS storage unit 210 and each unit in the NS control unit 210.

When each unit in the NS control unit 210 stores information (for example, identification information) in each unit in the NS storage unit 210, the NS data encrypting/decrypting unit 506 encrypts the information and stores the information. When each unit in the NS control unit 210 reads the information (for example, identification information) from each unit in the NS storage unit 210, the NS data encrypting/decrypting unit 506 decrypts the encrypted information and reads the information.

The cache server 300 further includes a CS data encrypting/decrypting unit 507 and the CS data encrypting/decrypting unit 507 is connected to each unit in the CS storage unit 310 and each unit in the CS control unit 320. The CS data encrypting/decrypting unit 507 encrypts and decrypts data, similar to the NS data encrypting/decrypting unit 506.

The client terminal 400 further includes a CL data encrypting/decrypting unit 508, and the CL data encrypting/decrypting unit 508 is connected to each unit in the CL storage unit 410 and each unit in the CL control unit 420. The CL data encrypting/decrypting unit 508 encrypts and decrypts data, similar to the NS data encrypting/decrypting unit 506.

As a result, tampering of data can be prevented and spoofing by tampering of biometric information or tampering of authentication log data can be prevented.

Encoding of Information to be Transmitted and Received

Figure 26:
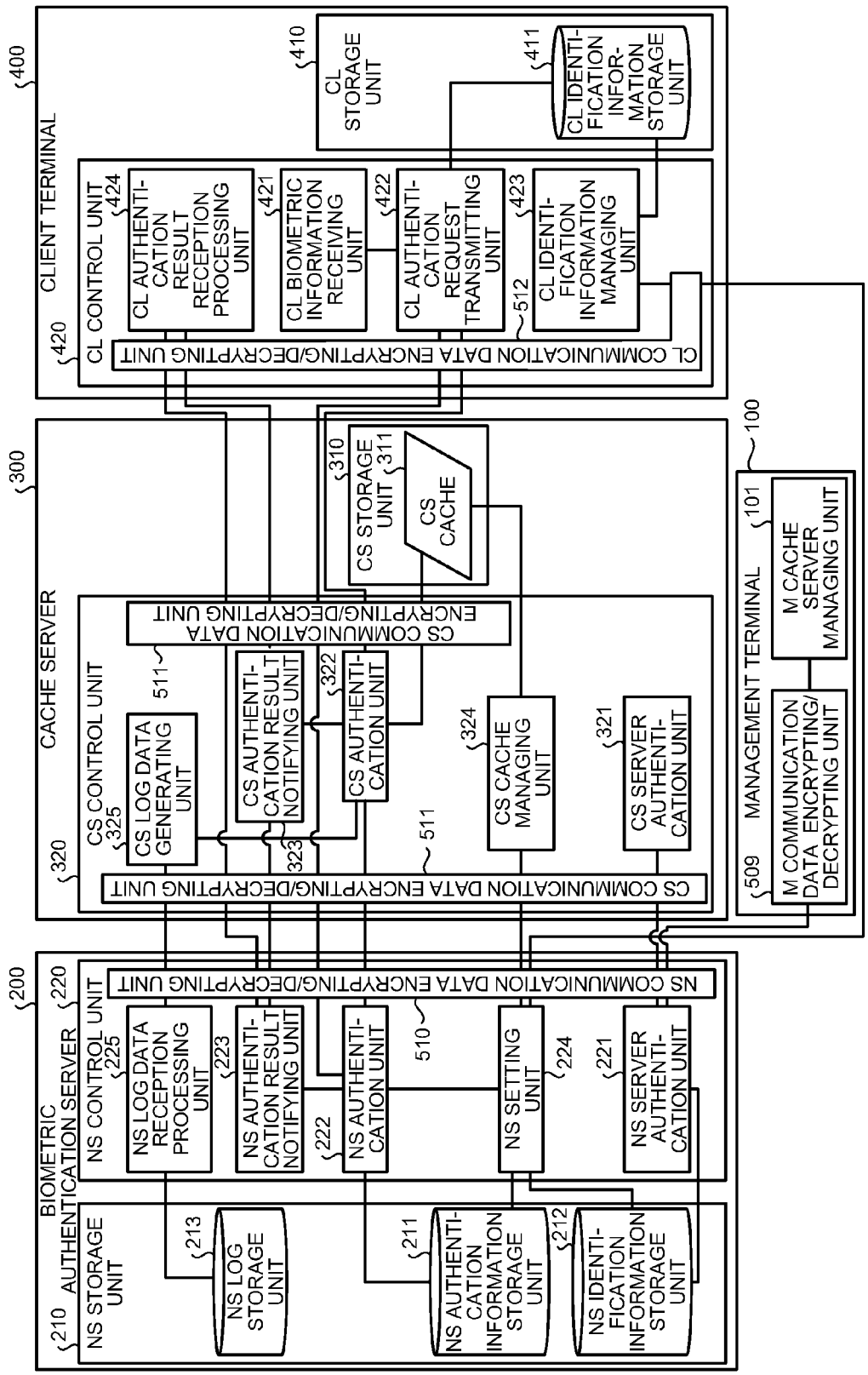
FIG. 26 is a block diagram illustrating an example of the configuration of the authentication system that encrypts information to be transmitted and received in the fifth embodiment.

For example, as illustrated in FIG. 26, the biometric authentication server 200, the cache server 300, and the client terminal 400 may encrypt information and transmit the information, and receive the encrypted information, decrypt the information, and use the information. FIG. 26 is a block diagram illustrating an example of the configuration of the authentication system that encrypts information to be transmitted and received in the fifth embodiment.

As illustrated in FIG. 26, the management terminal 100 further includes an M communication data encrypting/decrypting unit 509. The cache server 300 further includes a CS communication data encrypting/decrypting unit 511 and the client terminal further includes a CL communication data encrypting/decrypting unit 512.

The M communication data encrypting/decrypting unit 509 is connected to the M cache server managing unit 101 and an NS communication data encrypting/decrypting unit 510. If the M communication data encrypting/decrypting unit 509 receives information encrypted by the NS communication data encrypting/decrypting unit 510, the M communication data encrypting/decrypting unit 509 decrypts the information and transmits the information to the M cache server managing unit 101. The M communication data encrypting/decrypting unit 509 encrypts information (for example, identification information) that is transmitted from the M cache server managing unit 101.

The NS communication data encrypting/decrypting unit 510 is connected to each unit in the NS control unit 220, the M communication data encrypting/decrypting unit 509, and the CS communication data encrypting/decrypting unit 511. The NS communication data encrypting/decrypting unit 510 encrypts information (for example, authentication information) that is transmitted from each unit in the NS control unit 220. The NS communication data encrypting/decrypting unit 510 receives the information (for example, encrypted authentication information) that is encrypted by the M communication data encrypting/decrypting unit 509 or the CS communication data encrypting/decrypting unit 511, decrypts the information, and transmits the information to each unit in the NS control unit 210.

The CS communication data encrypting/decrypting unit 511 is connected to each unit in the CS control unit 320, the NS communication data encrypting/decrypting unit 510, and the CL communication data encrypting/decrypting unit 512. The CS communication data encrypting/decrypting unit 511 encrypts and decrypts data, similar to the NS communication data encrypting/decrypting unit 510.

The CL communication data encrypting/decrypting unit 512 is connected to each unit in the CS control unit 320, the NS communication data encrypting/decrypting unit 510, and the CL communication data encrypting/decrypting unit 512. The CS communication data encrypting/decrypting unit 511 encrypts and decrypts information, similar toe the NS communication data encrypting/decrypting unit 510.

As a result, in this authentication system, spoofing of an authentication request can be prevented. For example, there can be prevented a situation where a malicious third party acquires information transmitted and received between the biometric authentication server 200 or the client terminal 400, pretends to be a legitimate user, and transmit an authentication request.

Log Transmission

For example, in the first embodiment, the method in which the CS log data generating unit 325 transmits a log whenever the log is generated is described. However, the present invention is not limited thereto and the log may be transmitted according to a predetermined policy.

Specifically, in the cache server 300, a log that is related to the authentication processing executed by the cache server 300 is temporarily stored in the CS cache 311 or the disk device 502. The CS log data generating unit 325 transmits log information stored in the CS cache 311 or the disk device 502 to the biometric authentication server 200, according to a predetermined policy.

For example, the CS log data generating unit 325 uses a policy where a log is transmitted regularly (at a predetermined interval) or a policy where a log is transmitted after the log is accumulated by the predetermined capacity. As a result, the log information is not transmitted whenever the log information is authenticated, and concentrated transmission of the log information from each cache server 300 to the biometric authentication server can be prevented.

System Configuration

The information (for example, refer to FIGS. 1 to 26) that includes the processing sequence, the control sequence, the specific names, and the various data or parameters illustrated in the document or the drawings may be arbitrarily changed, except for the case where a specific mention is given.

The components of the individual devices that are illustrated in the drawings are functional and conceptual, and do not need to be physically configured as illustrated in the drawings. That is, the specific forms of separation/integration of the devices and the storage units are not limited to the forms illustrated in the drawings. All or part of the devices may be configured to be functionally or physically separated/integrated in an arbitrary unit according to the various loads or status of uses. In the example illustrated in FIG. 9, the management terminal 100 and the biometric authentication server 200 may be integrated and the NS storage unit 210 in the biometric authentication server 200 may be separated as an external storage device.

Computer

Further, the various processing described in the embodiments can be realized by executing a prepared program on a computer, such as a personal computer or a work station. Therefore, an example of the computer that executes the authentication program having the same function as the embodiments will be described hereinafter using FIGS. 27 to 30. Specifically, an example of a computer that executes a program having the same function as the management terminal 100 will be described hereinafter. Further, an example of a computer that executes a program having the same function as the biometric authentication server 200 will be described. Then, an example of a computer that executes a program having the same function as the cache server 300 and an example of a computer that executes a program having the same function as the client terminal 400 will be described.

Computer that Executes the Program Having the Same Function as the Management Terminal 100

Figure 27:
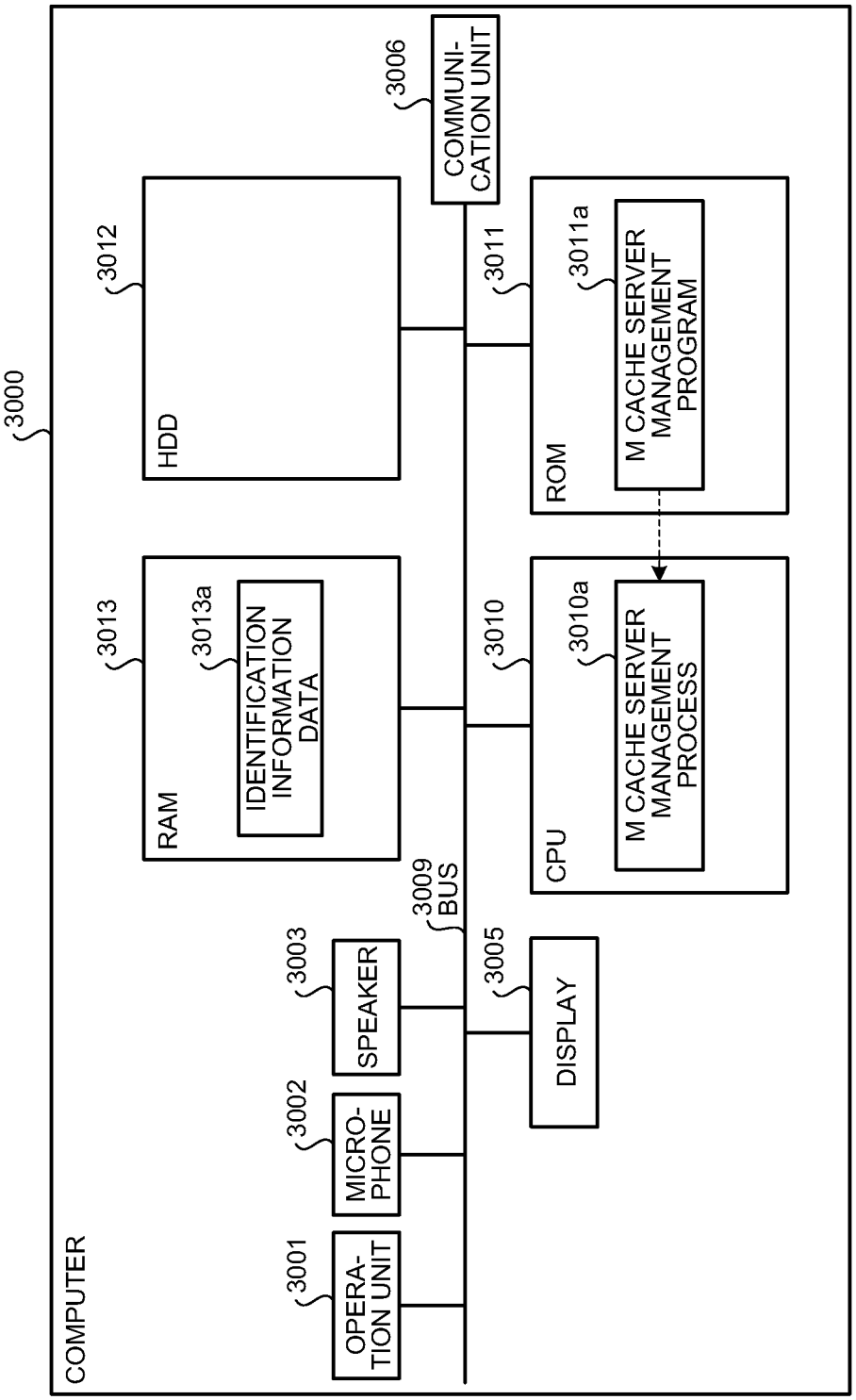
FIG. 27 is a diagram illustrating an example of a computer that executes a program having the same function as a management terminal.

As illustrated in FIG. 27, a computer 3000 that has the same function as the management terminal 100 includes an operation unit 3001, a microphone 3002, a speaker 3003, a display 3005, a communication unit 3006, a CPU 3010, a ROM 3011, an HDD 3012, and a RAM 3013. The computer 3000 is configured by connecting each unit by a bus 3009. The computer 3000 exchanges information with a computer 4000, a computer 5000, and a computer 6000 to be described below, through the communication unit 3006. FIG. 27 is a diagram illustrating an example of the computer that executes the program having the same function as the management terminal.

In the ROM 3011, a control program that has the same function as the M cache server managing unit 101 illustrated in the first embodiment, that is, as illustrated in FIG. 27, an M cache server management program 3011a is previously stored.

The CPU 3010 reads the program 3011a from the ROM 3011 and executes the program. As a result, as illustrated in FIG. 27, the program 3011a functions as an M cache server management process 3010a. The process 3010a corresponds to the M cache server managing unit 101 illustrated in FIG. 9.

The CPU 3010 executes an authentication program using identification information data 3013a stored in the RAM 3013.

Computer that Executes the Program Having the Same Function as the Biometric Authentication Server 200

Figure 28:
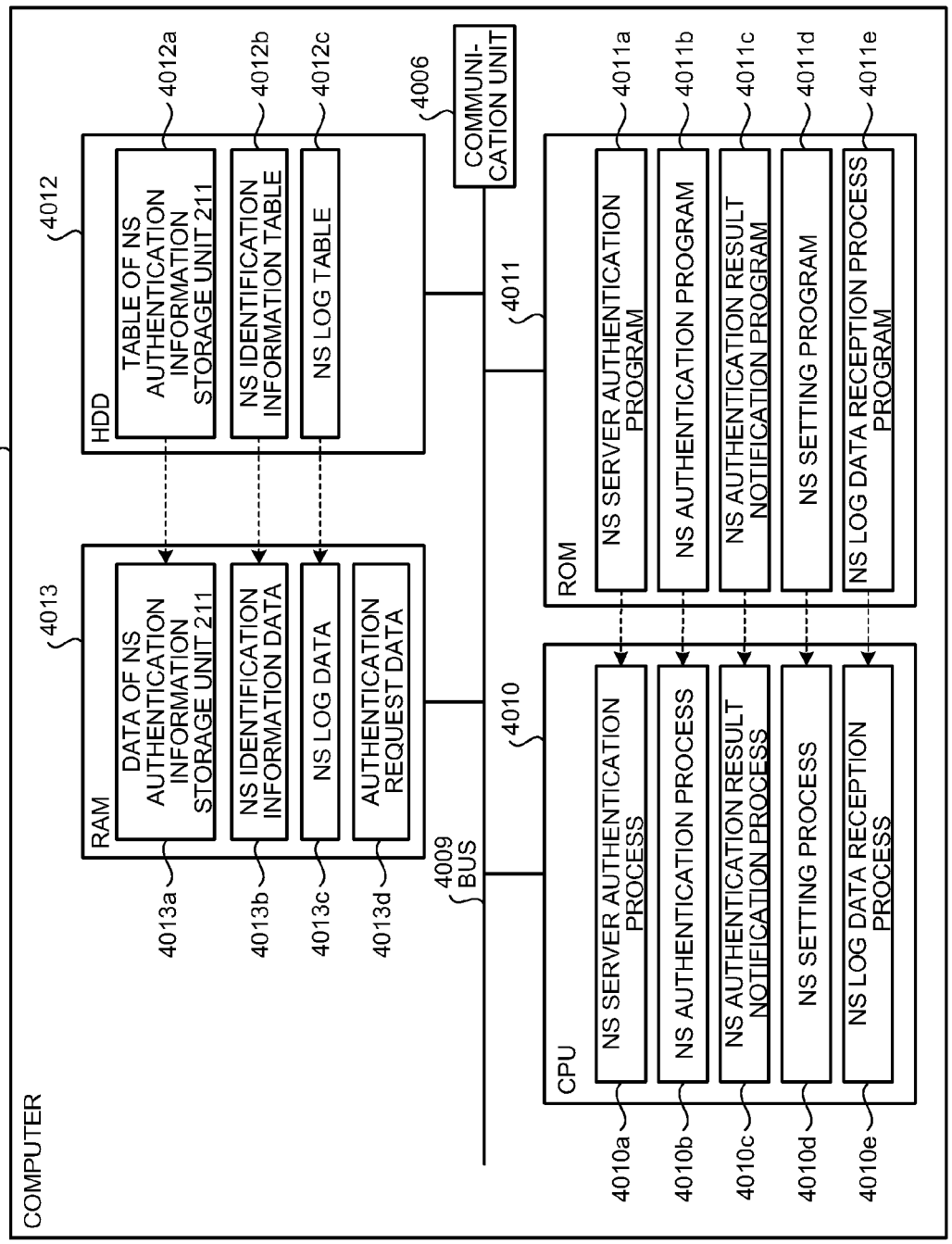
FIG. 28 is a diagram illustrating an example of a computer that executes a program having the same function as a biometric authentication server.

As illustrated in FIG. 28, the computer 4000 that has the same function as the biometric authentication server 200 includes a communication unit 4006, a CPU 4010, a ROM 4011, an HDD 4012, and a RAM 4013. The computer 4000 is configured by connecting each unit by a bus 4009. The computer 4000 exchanges information with the computer 3000, the computer 5000, and the computer 6000, through the communication unit 4006. FIG. 28 is a diagram illustrating an example of the computer that executes the program having the same function as the biometric authentication server.

In the ROM 4011, control programs that have the same functions as the NS server authentication unit 221, the NS authentication unit 222, the NS authentication result notifying unit 223, the NS setting unit 224, and the NS log data reception processing unit 225 illustrated in the first embodiment, that is, as illustrated in the same drawing, an NS server authentication program 4011a, an NS authentication program 4011b, an NS authentication result notification program 4011c, an NS setting program 4011d, and an NS log data reception processing program 4011e are previously stored. These programs 4011a to 4011e may be appropriately integrated or separated, similar to the components of the biometric authentication server 200 illustrated in FIG. 9.

The CPU 4010 reads these programs 4011a to 4011e from the ROM 4011 and executes the programs 4011a to 4011e. As a result, as illustrated in FIG. 28, the programs 4011a to 4011e function as an NS server authentication process 4010a, an NS authentication process 4010b, an NS authentication result notification process 4010c, an NS setting process 4010d, and an NS log data reception processing process 4010e, respectively.

The processes 4010a to 4010e correspond to the NS server authentication unit 221, the NS authentication unit 222, the NS authentication result notifying unit 223, the NS setting unit 224, and the NS log data reception processing unit 225 illustrated in FIG. 9.

In the HDD 4012, a table 4012a of the NS authentication information storage unit 211, an NS identification information table 4012b, and an NS log table 4012c are provided. The tables 4012a to 4012c correspond to the NS authentication information storage unit 211, the NS identification information storage unit 212, and the NS log storage unit 213 illustrated in FIG. 9.

The CPU 4010 reads the table 4012a of the NS authentication information storage unit 211, the NS identification information table 4012b, and the NS log table 4012c and stores the tables in the RAM 4013, and executes authentication processing using data 4013a of the NS authentication information storage unit 211, NS identification information data 4013b, NS log data 4013c, and authentication request data 4013d stored in the RAM 4013.

Computer that Executes the Program Having the same Function as the Cache Server 300

Figure 29:
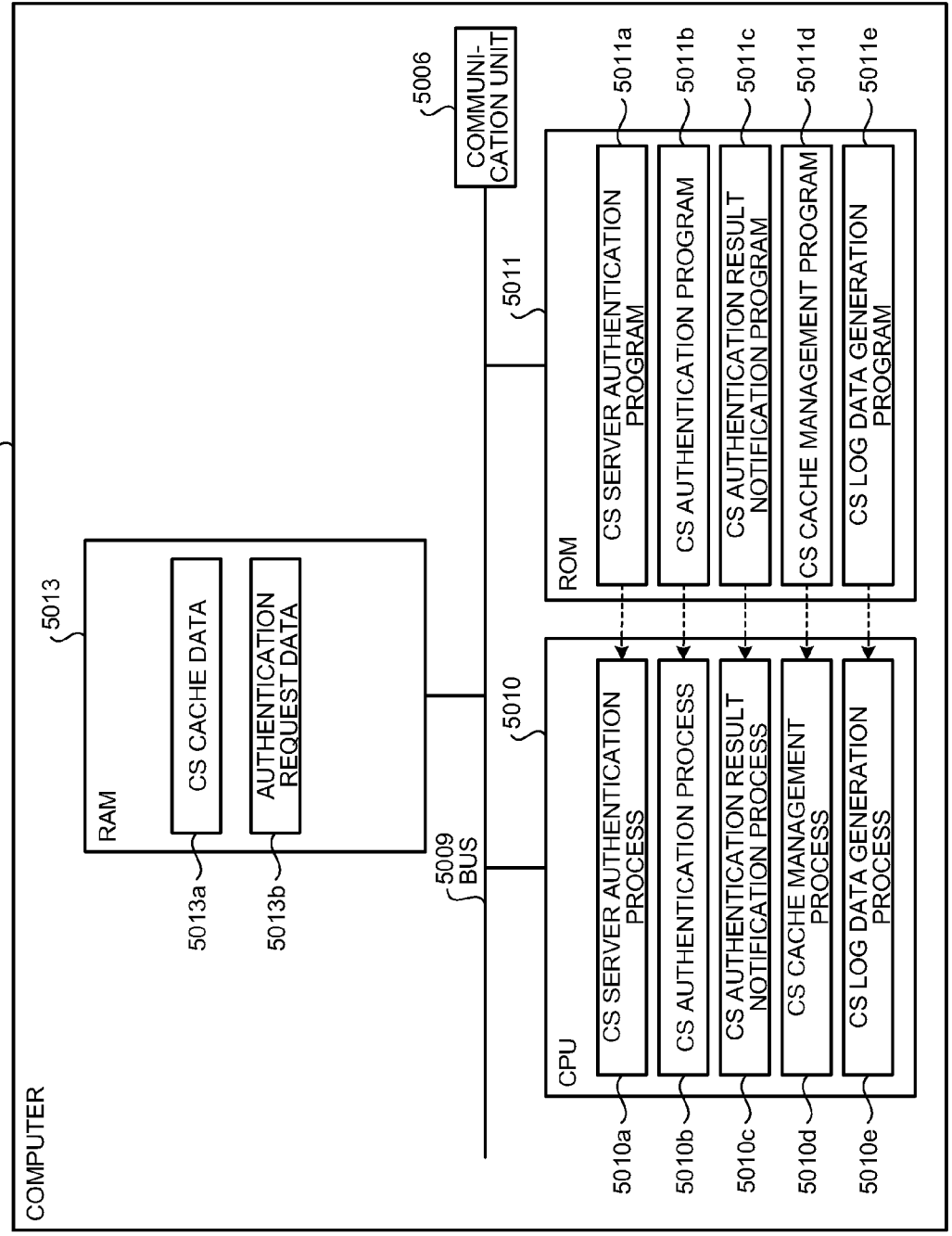
FIG. 29 is a diagram illustrating an example of a computer that executes a program having the same function as a cache server.

As illustrated in FIG. 29, the computer 5000 that has the same function as the cache server 300 includes a communication unit 5006, a CPU 5010, a ROM 5011, and a RAM 5013. The computer 5000 is configured by connecting each unit by a bus 5009. The computer 5000 exchanges information with the computer 3000, the computer 4000, and the computer 6000, through the communication unit 4006. FIG. 29 is a diagram illustrating an example of the computer that executes the program having the same function as the cache server.

In the ROM 5011, control programs that have the same functions as the CS server authentication unit 321, the CS authentication unit 322, the CS authentication result notifying unit 323, the CS cache managing unit 324, an the CS log data generating unit 325 illustrated in the first embodiment, that is, as illustrated in FIG. 29, an CS server authentication program 5011a, an CS authentication program 5011b, an CS authentication result notification program 5011c, an CS cache management program 5011d, and a CS log data generation program 5011e are previously stored. These programs 5011a to 5011e may be appropriately integrated or separated, similar to the components of the cache server 300 illustrated in FIG. 9.

The CPU 5010 reads these programs 5011a to 5011e from the ROM 5011 and executes the programs. As a result, as illustrated in FIG. 29, the programs 5011a to 5011e function as a CS server authentication process 5010a, a CS authentication process 5010b, a CS authentication result notification process 5010c, a CS cache management process 5010d, and a CS log data generation process 5010e, respectively.

The processes 5010a to 5010e correspond to the CS server authentication unit 321, the CS authentication unit 322, the CS authentication result notifying unit 323, the CS cache managing unit 324, and the CS log data generating unit 325 illustrated in FIG. 9.

The CPU 5010 executes the authentication program using the CS cache data 5013a and the authentication request data 5013b stored in the RAM 5013.

Computer that Executes the Program Having the Same Function as the Client Terminal 400

Figure 30:
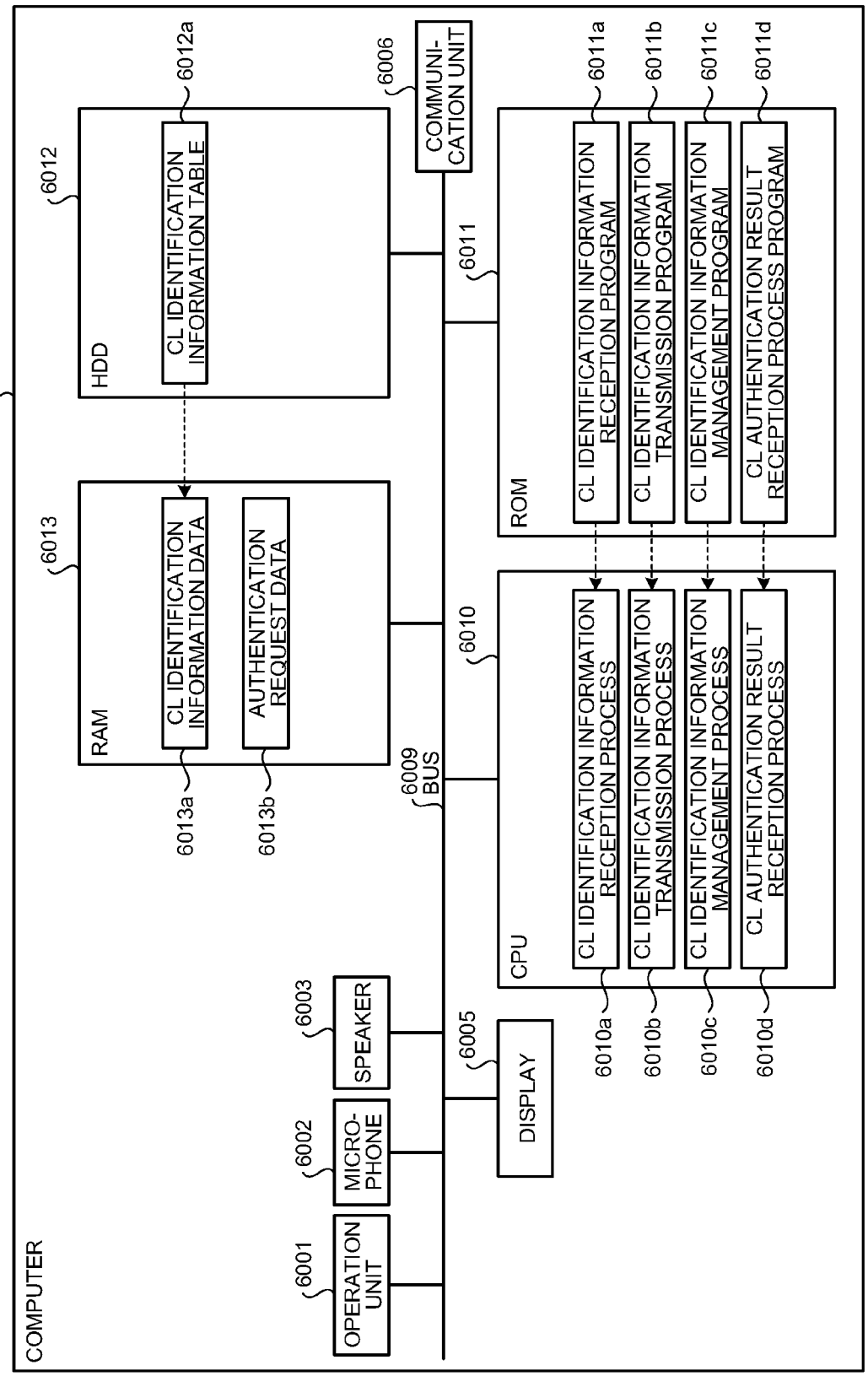
FIG. 30 is a diagram illustrating an example of a computer that executes a program having the same function as a client terminal.

As illustrated in FIG. 30, the computer 6000 that has the same function as the client terminal 400 includes an operation unit 6001, a microphone 6002, a speaker 6003, a display 6005, a communication unit 6006, a CPU 6010, a ROM 6011, an HDD 6012, and a RAM 6013. The computer 6000 is configured by connecting each unit by a bus 6009. The computer 6000 exchanges information with the computer 3000, the computer 4000, and the computer 5000, through the communication unit 4006. FIG. 30 is a diagram illustrating an example of the computer that executes the program having the same function as the client terminal.

In the ROM 6011, control programs that have the same functions as the CL biometric information receiving unit 421, the CL authentication request transmitting unit 422, the CL identification information managing unit 423, and the CL authentication result reception processing unit 424 illustrated in the first embodiment, that is, as illustrated in the same drawing, an CL identification information reception program 6011a, a CL identification information transmission program 6011b, a CL identification information management program 6011c, and a CL authentication result reception processing program 6011d are previously stored. These programs 6011a to 6011d may be appropriately integrated or separated, similar to the components of the client terminal 400 illustrated in FIG. 9.

The CPU 6010 reads these programs 6011a to 6011d from the ROM 6011 and executes the programs. As a result, as illustrated in FIG. 30, the programs 6011a to 6011d function as a CL identification information reception process 6010a, a CL identification information transmission process 6010b, a CL identification information management process 6010c, and a CL authentication result reception process 6010d, respectively.

The processes 6010a to 6010d correspond to the CL biometric information receiving unit 421, the CL authentication request transmitting unit 422, the CL identification information managing unit 423, and the CL authentication result reception processing unit 424 illustrated in FIG. 9.

In the HDD 6012, a CL identification information table 6012a is provided. The table 6012a corresponds to the CL identification information storage unit 411 illustrated in FIG. 9.

The CPU 6010 reads the CL identification information table 6012a and stores the CL identification information table in the RAM 6013, and executes an authentication program using CL identification information data 6013a and authentication request data 6013b stored in the RAM 6013.

Others

The authentication system that is described in this embodiment can be realized by executing a prepared authentication program on a computer such as a personal computer or a work station. The authentication program can be distributed through a network such as the Internet. The authentication program can be realized by recording the authentication program in a computer readable recording medium such as a hard disk, a flexible disk (FD), a CD-ROM, an MO, and a DVD and reading the authentication program from the recording medium by the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An authentication system, comprising:
an authentication server comprising a memory that stores authentication information to be used for authentication and a processor coupled to the memory of the authentication server;
a plurality of sub-authentication server comprising a memory and a processor coupled to the memory of the sub-authentication server;
a terminal comprising a memory and a processor coupled to the memory of the terminal, and
a management terminal comprising a memory and a processor coupled to the memory, wherein
the processor of the authentication server executes a process comprising
verifying, when receiving an authentication request which is to request to authenticate biometric information of a user using the terminal, the authentication information to authenticate the transmission origin of the authentication request using the authentication information for each sub-authentication server, when receiving the authentication request,
selecting the sub-authentication server where a degree of similarity calculated as a verification result becomes a predetermined threshold value or less, and
transmitting authentication information used to authenticate a transmission origin of the authentication request, to selected one of the plurality of sub-authentication server,
the processor of the authentication server and/or the processor of the sub-authentication server executes a process comprising transmitting identification information to identify the sub-authentication server to which the authentication information is transmitted by the authentication server, to the terminal that transmits the authentication request,
the memory of the terminal
stores identification information to identify a transmission destination of the authentication request;
the processor of the terminal executes a process comprising
transmitting the authentication request to a transmission destination identified with the identification information stored by the memory of the terminal; and
updating the identification information stored in the memory of the terminal using the identification information, when receiving the identification information, and
the memory of the sub-authentication server
stores the authentication information transmitted from the authentication server to the sub-authentication server,
the processor of the sub-authentication server executes a process comprising authenticating the transmission origin of the authentication request using the authentication information stored in the memory of the sub-authentication server, when receiving the authentication request, and
the processor of the authentication server and/or the management terminal further executes a process comprising
deleting a part of the authentication information stored by the memory of the sub-authentication server with respect to the sub-authentication server where the frequency of performing the authentication is high as compared with the other sub-authentication servers,
storing the authentication information deleted in the memory of the sub-authentication server; with respect to the sub-authentication server where the frequency of performing the authentication is low as compared with the other sub-authentication servers, and
transmitting identification information to identify the sub-authentication server becoming the storage destination where the authentication information is stored, to the transmission origin authenticated using the authentication information deleted.

2. The authentication system according to claim 1, wherein the processor of the sub-authentication server further executes a process of determining whether a current state is a state where the empty capacity of the memory of the sub-authentication server needs to be increased; and deleting a part of the authentication information stored in the memory of the sub-authentication server, when it is determined that the current state is the state where the empty capacity needs to be increased.

3. The authentication system according to claim 2, wherein the memory of the sub-authentication server stores a valid period of the authentication information with respect to each piece of authentication information, and the processor of the sub-authentication server further executes a process of deleting the authentication information where the valid period expires, from the memory of the sub-authentication server.

4. The authentication system according to claim 3, wherein the memory of the sub-authentication server includes storing the authentication information in a cache, and the processor of the sub-authentication server including a disk device further executes a process of backing up the authentication information stored in the memory of the sub-authentication server in the disk device.

5. The authentication system according to claim 4, wherein the disk device stores the authentication information that is transmitted by the authentication server, when the empty capacity does not exist in the memory of the sub-authentication server, and the processor of the sub-authentication server further executes a process of the authentication using the authentication information stored in the memory of the sub-authentication server and the disk device.

6. The authentication system according to claim 5, wherein the memory of the sub-authentication server further includes storing log information related to the authentication performed by the sub-authentication server, and the processor of the sub-authentication server further executes a process of a transmitting the log information stored in the memory of the sub-authentication server to the authentication server, according to a predetermined policy.

7. The authentication system according to claim 6, wherein the memory of the terminal includes storing identification information to identify the authentication server, separately from the identification information transmitted.

8. The authentication system according to claim 7, wherein each of the memory of the authentication server and the memory of the sub-authentication server includes storing an authentication program to be used for the authentication, the processor of the authentication server further executes, when the authentication program stored in the memory of the authentication server is updated, a process of transmitting the updated authentication program to the sub-authentication server, and the processor of the sub-authentication server further executes a process of updating the authentication program stored in the memory of the sub-authentication server, using the authentication program transmitted, when receiving the authentication program.

9. The authentication system according to claim 8, wherein the memory of the authentication server, the memory of the sub-authentication server, and the memory of the terminal store information in an encrypted state.

10. The authentication system according to claim 9, wherein the processor of the authentication server, the processor of the sub-authentication server, and the processor of the terminal further executes a process of encrypting information and transmitting the information, and decrypting the encrypted information, when receiving the encrypted information.

11. The authentication system according to claim 1, wherein the memory of the authentication server further includes storing attribute information of a user authenticated by the authentication information, for each piece of authentication information;

the processor of the authentication server further executes a process of selecting the same sub-authentication server for each kind of the attribute information, using the attribute information stored in the memory of the authentication server corresponding to the authentication information used to authenticate the authentication request, when receiving the authentication request, and transmitting the authentication information to the sub-authentication server selected.

12. An authentication server, comprising:
a memory that stores authentication information to be used for authentication; and
a processor coupled to the memory, wherein the processor executes a process comprising:
verifying, when receiving an authentication request which is to request to authenticate biometric information of a user using the terminal, the authentication information to authenticate the transmission origin of the authentication request using the authentication information for each sub-authentication server, when receiving the authentication request;
selecting the sub-authentication server where a degree of similarity calculated as a verification result becomes a predetermined threshold value or less;
transmitting the authentication information used to authenticate a transmission origin of an authentication request, to one of a plurality of sub-authentication server, when receiving the authentication request;
transmitting identification information to identify the sub-authentication server to which the authentication information is transmitted, to a terminal, the terminal transmitting the authentication request to a transmission destination identified with the identification information, being the transmission origin of the received authentication request, and updating the identification information stored in a memory of the terminal using the identification information transmitted when receiving the identification information;
deleting a part of the authentication information stored by the memory of the sub-authentication server with respect to the sub-authentication server where the frequency of performing the authentication is high as compared with the other sub-authentication servers;
storing the authentication information deleted in the memory of the sub-authentication server; with respect to the sub-authentication server where the frequency of performing the authentication is low as compared with the other sub-authentication servers; and transmitting identification information to identify the sub-authentication server becoming the storage destination where the authentication information is stored, to the transmission origin authenticated using the authentication information deleted.

13. An authentication method comprising:

verifying, when receiving an authentication request which is to request to authenticate biometric information of a user using a terminal, the authentication information to authenticate the transmission origin of the authentication request using the authentication information for each sub-authentication server, when receiving the authentication request;

selecting the sub-authentication server where a degree of similarity calculated as a verification result becomes a predetermined threshold value or less, transmitting authentication information used to authenticate a transmission origin of the authentication request to selected one of the plurality of sub-authentication server;

transmitting identification information to identify the sub-authentication server to which the authentication information is transmitted to the terminal that transmits the authentication request;

transmitting the authentication request to a transmission destination identified with the identification information stored by a transmission destination storage unit;

updating the identification information stored in the transmission destination storage unit using the transmitted identification information, when receiving the identification information;

authenticating the transmission origin of the authentication request using the transmitted authentication information transmitted, when receiving the authentication request;

deleting a part of the authentication information stored by the memory of the sub-authentication server with respect to the sub-authentication server where the frequency of performing the authentication is high as compared with the other sub-authentication servers;

storing the authentication information deleted in the memory of the sub-authentication server; with respect to the sub-authentication server where the frequency of performing the authentication is low as compared with the other sub-authentication servers; and transmitting identification information to identify the sub-authentication server becoming the storage destination where the authentication information is stored, to the transmission origin authenticated using the authentication information deleted.

* * * * *